United States Patent
Files et al.

(10) Patent No.: US 11,523,604 B2
(45) Date of Patent: *Dec. 13, 2022

(54) PEST TRAP WITH DISPOSABLE CONTAINER AND WIRELESS MONITORING

(71) Applicants: Jace W. Files, Round Rock, TX (US); John Trevor Morrison, Round Rock, TX (US); Shivshanker Somashekar Naimpally, Austin, TX (US)

(72) Inventors: Jace W. Files, Round Rock, TX (US); John Trevor Morrison, Round Rock, TX (US); Shivshanker Somashekar Naimpally, Austin, TX (US)

(*) Notice: Subject to any disclaimer, the term of this patent is extended or adjusted under 35 U.S.C. 154(b) by 519 days.

This patent is subject to a terminal disclaimer.

(21) Appl. No.: 16/783,448

(22) Filed: Feb. 6, 2020

(65) Prior Publication Data

US 2020/0253187 A1 Aug. 13, 2020

Related U.S. Application Data

(63) Continuation of application No. 16/271,488, filed on Feb. 8, 2019, now Pat. No. 10,849,320.

(51) Int. Cl.
*A01M 23/38* (2006.01)
*A01M 23/18* (2006.01)
*A01M 99/00* (2006.01)
*A01M 19/00* (2006.01)

(52) U.S. Cl.
CPC ............ *A01M 23/38* (2013.01); *A01M 19/00* (2013.01); *A01M 23/18* (2013.01); *A01M 99/00* (2013.01)

(58) Field of Classification Search
CPC ...... A01M 12/38; A01M 23/18; A01M 23/00; A01M 23/16; A01M 19/00; A01M 99/00
See application file for complete search history.

(56) References Cited

U.S. PATENT DOCUMENTS

| | | | | |
|---|---|---|---|---|
| 4,214,399 A * | 7/1980 | Bradley | ................ | A01M 23/08 43/66 |
| 4,578,892 A * | 4/1986 | Melton | ................. | A01M 23/18 43/58 |
| 5,148,625 A * | 9/1992 | Saleman | ............... | A01M 23/18 43/107 |
| 5,327,673 A * | 7/1994 | Paglia | ................... | A01M 23/18 43/61 |

(Continued)

*Primary Examiner* — Christopher R Harmon
(74) *Attorney, Agent, or Firm* — Shiv S. Naimpally

(57) ABSTRACT

In some examples, a trap to electrocute a pest may include a logic board. The logic board may create an open circuit using two electrical contacts in touch with two conductive plates in a container located in the trap. A pest entering the container may touch the two conductive plates, causing the circuit to close. Based on determining that the circuit was closed, the logic board may determine that a pest entered the trap. The logic board may cause a shutter inside the trap to move from an approximately horizontal position to an approximately vertical position, thereby causing a portion of a door of the container to close by causing two latch strikes of the door to engage with the two jaws of the container. The circuit may send a wireless notification message, indicating that the pest was captured in the container, over a wireless network to a computing device.

20 Claims, 19 Drawing Sheets

(56) References Cited

U.S. PATENT DOCUMENTS

| | | | | |
|---|---|---|---|---|
| 6,836,999 B2* | 1/2005 | Rich | ............ | A01M 19/00 |
| | | | | 43/98 |
| 2010/0134301 A1* | 6/2010 | Borth | ............ | G08C 17/02 |
| | | | | 340/573.2 |
| 2018/0325092 A1* | 11/2018 | Round | ............ | A01M 23/12 |
| 2019/0029244 A1* | 1/2019 | Steele | ............ | A01M 1/06 |
| 2019/0037829 A1* | 2/2019 | Laut | ............ | G01R 33/093 |
| 2019/0166823 A1* | 6/2019 | Dick | ............ | A01M 23/38 |
| 2019/0246621 A1* | 8/2019 | Kletzli | ............ | A01M 31/002 |
| 2020/0005626 A1* | 1/2020 | Triventi | ............ | G08B 25/009 |

* cited by examiner

PEST TRAP WITH DISPOSABLE CONTAINER AND WIRELESS MONITORING

CROSS-REFERENCE TO RELATED APPLICATIONS

The present patent application is a continuation-in-part of U.S. patent application Ser. No. 16/271,488, filed on Feb. 8, 2019, entitled "PEST TRAP WITH DISPOSAL CONTAINER AND WIRELESS MONITORING" and is incorporated by reference herein in its entirety and for all purposes as if completely and fully set forth herein.

BACKGROUND OF THE INVENTION

Field of the Invention

The invention relates to pest traps and more particularly to a pest trap that can be wirelessly monitored and that includes a disposal container.

Description of the Related Art

Pest control has remained largely unchanged for many years. Modern pest control is low-tech, with glue traps or mechanical traps that are manually baited with peanut butter or similar attractants. Once traps are set, a user (e.g., either a homeowner or a pest control service) must manually examine each trap to avoid having a trapped pest slowly die and decay over time and to re-bait each trap as needed. In addition, disposal of the decaying body of a pest is an unpleasant experience for the user.

SUMMARY OF THE INVENTION

In some examples, a trap to electrocute a pest may include a logic board. The logic board may create an open circuit using two electrical contacts in touch with two conductive plates in a container located in the trap. A pest entering the container may touch the two conductive plates, causing the circuit to close. Based on determining that the circuit was closed, the logic board may determine that a pest entered the trap. The logic board may cause a shutter inside the trap to move from an approximately horizontal position to an approximately vertical position, thereby causing a portion of a door of the container to close by causing two latch strikes of the door to engage with the two jaws of the container. The circuit may send a wireless notification message, indicating that the pest was captured in the container, over a wireless network to a computing device.

DETAILED DESCRIPTION

Figure 1:
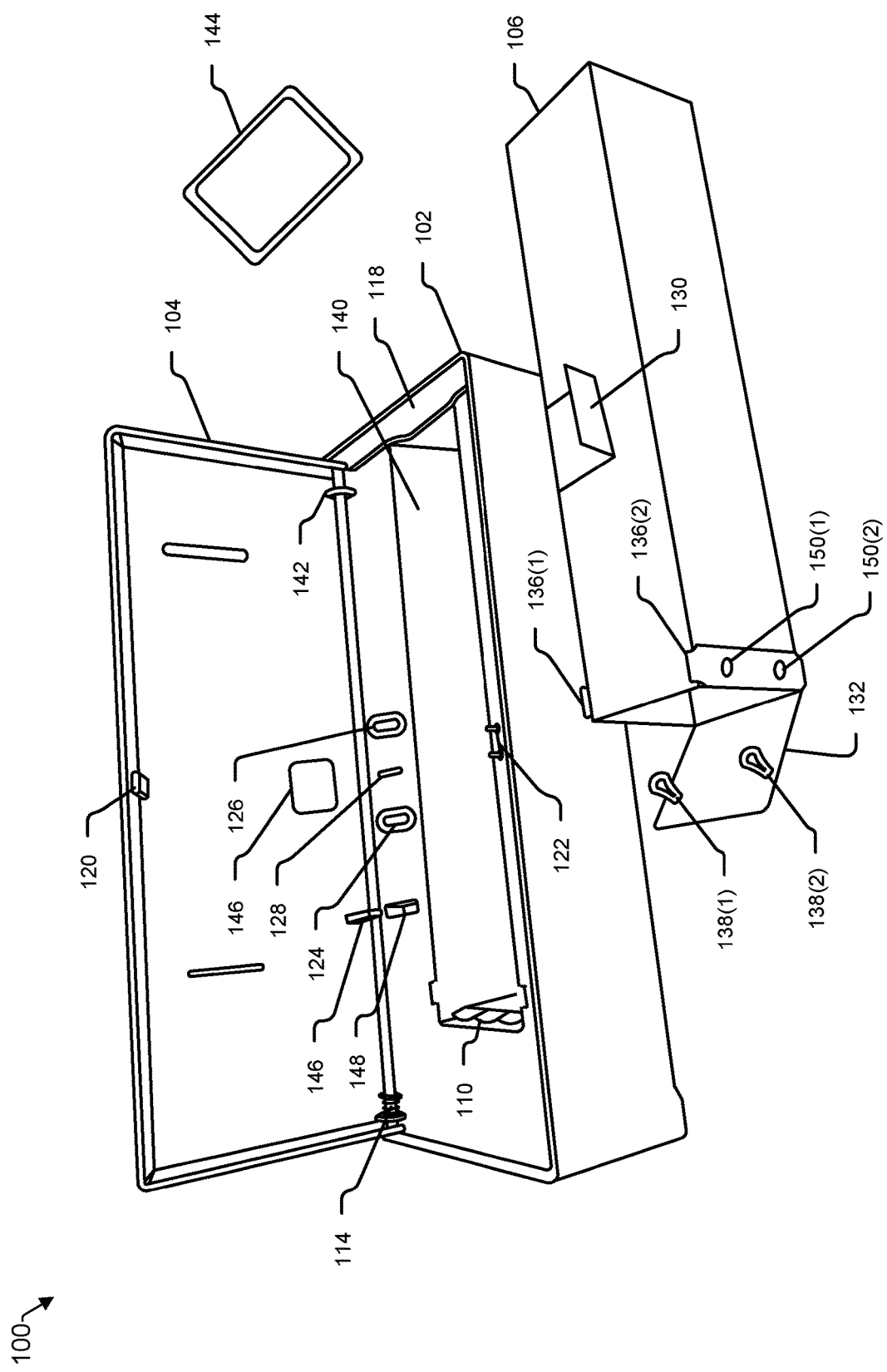
FIG. 1 is a block diagram illustrating a trap with a hinged lid, according to some embodiments.

The systems and techniques herein describe a pest trap ("trap") that can detect when a pest has been killed and, in response, send an alert to a computing device associated with a homeowner or a pest control service. The trap may include a container (e.g., paper, treated paper, plastic, or the like) to hold the dead pest and to enable the dead pest to be hygienically disposed. The trap may include one or more sensors, such as, for example, a motion sensor, an imaging sensor (e.g., a camera), an audio transducer (e.g., microphone), a structured light sensor, an ultrasound sensor, an infrared imaging sensor, a temperature (e.g., a thermistor) sensor, an ultrasonic sensor, a capacitive sensor, a micropower impulse radar sensor, a global positioning satellite (GPS) sensor, an altimeter (e.g., to detect which floor of a building the trap has been placed, based on altitude), mmWave, and the like. Structured light involves projecting a known pattern (e.g., a grid or horizontal bars) of light on to an area (e.g., detection zone). The way in which the light deforms when striking the area enables a vision system (e.g., imaging sensor(s) and software) to determine the depth and surface information associated with a pest in the area. An mmWave sensor is able to detect objects (e.g., pests) and provide a range, a velocity, and an angle of each of the objects. An mmWave sensor operates in the spectrum between 30 GHz and 300 GHz. At least one sensor may be inward facing to detect when a pest has been captured in the container. In some cases, one or more additional sensors may be outward facing to enable the trap to detect pest activity in an area in which the trap is located.

The additional sensors may monitor a particular area (e.g., detection zone). When a sensor (e.g., motion trap, infrared imaging sensor, or the like) detects motion associated with a potential pest in the detection zone, sensor data, such as an image of the potential pest, may be captured. For example, an ambient light sensor (ALS) may detect an amount of light. If the ALS detects that the amount of available light satisfies a light threshold, then an imaging sensor may be used to capture a digital image (or a set of digital images=a video) of the potential pest. If the ALS detects that the amount of available light does not satisfy the light threshold, then either an infrared imaging sensor may be used to capture a digital image of the potential pest or a light emitting diode (LED) may be used as a flash to briefly illuminate the potential pest to enable an imaging sensor to capture a digital image.

The ALS may be used to transition the trap to and from a low power mode. For example, many pests tend to be active during darkness. Thus, the trap may be in a detection mode when the light measured by the ALS satisfies a light threshold (or the presence of a human is detected). The trap may transition from the detection mode to a low power mode when the ALS determines that the light does not satisfy the light threshold (or a presence of a human is not detected for more than a threshold amount of time). When the ALS determines that the light satisfies the threshold (or detects the presence of a human), the trap may transition from the low power mode to the detection mode. For example, if the trap is powered using a battery, then transitioning to the low power mode may conserve battery power and enable the trap to function for a longer time using one or more batteries as compared to if the low power mode was not used. Traps that draw power from an electrical outlet (e.g., alternating current (A/C)) may, in some cases, not use the low power mode. The low power mode may be a user selectable option such that a user can select to disable low power mode, thereby causing the trap to remain in detection mode.

The trap may be available in different models, such as a battery powered model and an A/C powered model. Some models may include a weather sealed model (e.g., that uses gaskets) to prevent moisture and particulate matter from entering into a housing of the trap to enable the trap to be used outdoors to capture outdoor pests (e.g., rabbits, squirrels, raccoons, snakes, wasps, and the like). The trap models may include a modular model that enables sensor modules to be attached to (and detached from) the housing of the trap.

Each trap may include one or more external indicator lights (e.g., on a front faceplate) to visually indicate a mode (e.g., detection mode or low-power mode), network connectivity (e.g., connected to or disconnected from network), pest capture (e.g., green indicates trap is active, red indicates a pest was captured), and other information associated with the trap.

Each trap may include a wireless network interface (e.g., WiFi®, Bluetooth®, or the like) to enable the trap to communicate with (i) other traps (e.g., to create a mesh network), (ii) an application ("app") executing on a user's computing device, (iv) a cloud-based server, (iii) a pest services company, or any combination thereof. For example, the trap may create a mesh network with other traps using a short distance networking protocol, such as, for example, Bluetooth®, ZigBee, or the like. As another example, the trap may communicate with other traps, one or more user devices, a server, or other devices using WiFi® or another type of wireless networking technology. The trap may communicate data to an application executing on a user device, such as a smartphone, a tablet, or a virtual assistant enabled device (e.g., Amazon® Echo® or Alexa®, Google® Home, Apple® Homepod, or the like).

A software application ("app") may be downloaded and installed on a user device, such as a computing device associated with an occupant of a home, a warehouse staff member, a pest control service, or the like. The app may display a user interface (UI) to display data received from multiple traps in a particular location, such as a house, a warehouse, an industrial plant, or another type of building or set of buildings. For example, the UI may display an approximate floor plan of the particular location and an approximate location of each trap within the floor plan. The UI may display data associated with each trap, such as a mode (e.g., detection mode or low-power mode), network connectivity (e.g., connected to or disconnected from a network), whether or not the trap has captured a pest (e.g., green indicates trap is active, red indicates that a pest has been captured), and other information associated with the trap. The UI may enable a user to view the data gathered by each trap, such as a digital image of the pest that was captured in the trap.

In some cases, a pest control service provider may rent multiple traps to homeowners or commercial users while providing pest control services (e.g., removing a captured pest from each trap and resetting each trap) to the location in which the traps are deployed. For example, the pest control service provider may place one or more traps in a home and remotely (e.g., via wireless networking) monitor a status of each of the traps. When a trap captures and kills (e.g., electrocutes) a pest, the trap may send a wireless notification message to the service provider. The service provider may send a representative to dispose of the captured pest and reset the trap by placing a new container in the trap and resetting the detection circuit and indicator light.

As an example, a trap may include a container placed inside a housing. A first electrical contact and a second electrical contact may be located on an inner bottom surface of the housing. A first conductive plate and a second conductive plate may be located on an inner bottom surface of the container. A first portion of the first conductive plate may be exposed to an exterior bottom surface of the container and touching the first electrical contact and a second portion of the second conductive plate may be exposed to the exterior bottom surface of the container and touching the second electrical contact. The trap may include a circuit board (e.g., logic board) with one or more processors and one or more non-transitory computer readable media storing instructions executable by the one or more processors to perform various operations. For example, the operations may include providing electricity in an open circuit that includes the first electrical contact and the second electrical contact. After a pest enters into the container and makes contact with both the first conductive plate and the second conductive plate, the electricity passes from the first conductive plate through the pest to the second conductive plate to electrocute the pest. The logic board may, based on determining that the open circuit has been closed by the pest, cause a shutter inside the trap to move from an approximately horizontal position to an approximately vertical position, thereby causing a door of the container to close. The logic board may send a notification message over a wireless network to a computing device. The notification message may indicate that the pest has been captured in the container. The container is removed from the trap and replaced with a new container after the electricity passes through the pest. The trap includes a bait comprising a permeable membrane infused with a nut-based attractant or a grain-based attractant. The container comprises treated paper, the treated paper comprising paper treated with a coating comprising wax or plastic. Causing the shutter inside the trap to move from the approximately horizontal position to the approximately vertical position may release a latch, causing a spring mechanism in a shutter hinge attached to the shutter to contract. Causing the shutter inside the trap to move from the approximately horizontal position to the approximately vertical position may include providing the electricity to a motor located in a shutter hinge attached to the shutter, causing the motor to move the shutter at the shutter hinge. The shutter moving from the approximately horizontal position to the approximately vertical position causes a first latch strike of the door to engage with a first pair of latch jaws of the container and a second latch strike of the door to engage with a second pair of latch jaws of the container. The notification message may indicate that the pest was captured in the container. The notification message may notify a user that the container is to be removed from the trap and replaced with a new container.

FIG. 1 is a block diagram illustrating a trap 100 with a hinged lid, according to some embodiments. The trap 100 may include a housing 102 and a lid 104. For example, the housing 102 and the lid 104 may both be made out of plastic or a similar material. The lid 104 may be attached to the housing 102 with one or more hinges, such as the hinge 142. The lid 104 may be held open by at least one spring, such as the spring 114. The spring 114 may be coiled over a second hinge. The lid 104 may be closed by pushing down on a top surface of the lid 104 to enable a housing latch strike 120 to engage with housing latch jaws 122. For example, the lid 104 may use a "push-push" mechanism in which when the lid 104 is in an open position (e.g., as illustrated in FIG. 1), a first push on a top surface of the lid 104 (e.g., approximately above the housing strike latch 120) causes the housing latch strike 120 to engage with the housing latch jaws 122 to temporarily hold the lid 104 in a closed position. When the lid 104 is in the closed position, a second push on the top surface of the lid 104 (e.g., just above the housing latch strike 120) causes the housing latch strike 120 to disengage from the housing latch jaws 122, causing the spring 114 to open the lid 104 and hold the lid 104 in the open position.

The housing 102 may include a shutter 110. When a pest enters into the housing 102, the shutter 110 may move from an approximately horizontal position (e.g., trap 100 is open and armed) to an approximately vertical position (e.g., the trap 100 is closed and has captured a pest).

When the lid 104 is in the open position, a container 106 (e.g., an empty container) may be placed in a receptacle 140 of the housing 102 or the container 106 may be removed from the housing 102 (e.g., after a pest has been captured in the container 106). The container 106 may, for example, be made using treated paper (e.g., waxed cardboard or similar material). The container 106 may include a handle 130 that has an approximately 90-degree angle to a top surface of the container 106. The handle 130 may be used to hold the container 106 when placing the container 106 (e.g., when empty) in the housing 102 or when removing the container 106 from the housing 102 (e.g., after a pest has entered). The container 106 may include a door 132. The door 132 of the container 106 may engage with a shutter 110 of the housing 102 as described herein, such that the shutter 110 (i) can place the door 132 in an open position to enable a pest to enter the container 106 and (ii) can place the door 132 in a closed position after the pest has entered the container 106. In the closed position, container latch strikes 138(1), 138(2) may engage with container latch jaws (as illustrated in FIG. 2) inside the opening of the box 106 to close the container 106 and prevent the door 132 from opening. Side braces 136(1), 136(2) may be located on either side of the opening of the container 106. The side braces 136 may be cardboard or plastic and may be glued or riveted, as illustrated in FIG. 1, to either side of the container 106. For example, in FIG. 1, the side brace 136(2) is illustrated as being attached to one side of the container 106 using plastic rivets 150(1), 150(2). Thus, the side braces 136 may be used to "key" the container 106 such that the container 106 can be placed into the receptacle 140 to enable the door 132 to engage with the shutter 110 and prevent the container 106 from being placed into the receptacle 140 with the door 132 at the opposite end (e.g., relative to the shutter 110) of the receptacle 140. For example, the receptacle 140 may include orientation grooves (as illustrated in FIG. 3) into which the side braces 136 may slide, such that the container 106 can only be placed into the receptacle 140 with an orientation in which the door 132 is able to engage with the shutter 110.

The housing 102 may include one or more indicator lights 128. In some cases, the lid 104 may be made of an opaque material and may include a transparent or translucent window 146 to enable the indicator lights 128 to be viewed when the lid 104 is in the closed position. In other cases, the lid 104 may be made using a transparent or translucent material (e.g., clear or lightly tinted) with a transparent (e.g., clear) window 146. In still other cases, the lid 104 may be transparent (e.g., clear) and may not include the window 146 because the transparent lid 104 enables a user to view the indicator lights 128.

The indicator lights 128 may include a power indicator light to indicate a status of the power (e.g., batteries), with green indicating sufficient power, yellow indicating that the power level (e.g., voltage and/or current level) has dropped below a first threshold, and red indicating that the power level has dropped below a second threshold. The indicator lights 128 may include a wireless connection indicator light to indicate a status of a wireless connection (e.g., using W-Fi, Bluetooth, ZigBee, or the like), with green indicating a strong signal strength, yellow indicating an adequate signal strength (e.g., below a maximum strength), and red indicating that the wireless connection is absent or intermittent. The indicator lights 128 may include a trap indicator light to indicate a status of the trap 100, with green indicating that the trap 100 is armed and red indicating that a pest has entered and been killed in the container 106 and the container 106 is to be replaced with another container. The indicator lights 128 may include a bait indicator light to indicate a level of a bait packet 144, with green indicating the bait packet 144 is relatively new, yellow indicating that the level of the bait packet has dropped below a first threshold and is to be replaced within the next week, and red indicating that the bait packet is empty (or nearly empty) and is to be replaced (e.g., immediately replaced).

For example, each of the indicators 128 may use light emitting diodes (LED), organic LED (OLED), or another type of technology. Each of the indicators 404 may visually provide information about a status of a power source (e.g., batteries), an amount of the bait packet 144, a network connectivity of the trap, whether a pest has been captured (and electrocuted) in the container 106, and other information related to the trap 100. For example, one of the indicators 404 may visually provide information about a status of a power source (e.g., the battery 116) by indicating green (sufficient power), yellow (power level is nearing a threshold below which the trap may not function properly), and red (battery needs to be replaced). Another of the indicators 404 may visually provide information about a status of an amount of the bait packet 144 by indicating green (sufficient bait), yellow (amount of bait is nearing a threshold below which the trap may not function properly), and red (bait needs to be replaced). Yet another of the indicators 404 may visually provide information about a network connectivity of the trap (e.g., the circuit 706) by indicating green (connected to the network), yellow (transmission issues), and red (unconnected to the network). Another of the indicators 404 may visually provide information about whether a pest has been captured (and electrocuted) in the container 106 by indicating green (armed) and red (pest captured, e.g., the container 106 is to be disposed of and replaced with a new container).

The housing 102 may include a bait receptacle 118 into which a bait packet 144 may be placed. In some cases, a diffuser (e.g., an ultrasonic or a heat-based diffuser) in the housing 102 may spread the smell of the bait packet 144 in the air surrounding the trap 100. The bait packet 144 may be a liquid attractant infused membrane (e.g., permeable membrane) or scented gel. The attractant may be a nut-based oil (e.g., peanut oil, hazelnut oil, almond oil, or the like) or a grain-based oil. The membrane or gel may enable the attractant to evaporate at a controlled rate. The membrane or gel may (1) enable a small amount of the attractant to flow in the membrane pores for evaporation at the surface and (2) prevent the attractant from spilling. In some cases, a circuit in the trap 100 may determine an approximate amount of the bait packet 144 that has been deployed, an approximate amount of the remaining bait in the bait packet 144, or both and provide this information wirelessly (e.g., via Wi-Fi, Bluetooth, ZigBee, or the like) to an application executing on a computing device. In other cases, the circuit may determine (e.g., based on a temperature and a humidity of the surrounding area) an evaporation rate of the attractant in the bait packet 144 and determine approximately how long the bait packet 144 will last. The temperature and humidity may be determined based on sensor data received from one or more sensors (e.g., a temperature sensor, a humidify sensor, and the like) of the trap 100. When the circuit determines that the bait packet 144 is to be replaced (e.g., based on the estimate as to how long the bait will last), the circuit may (1) use an indicator light on an external surface of the trap 100 indicating that the bait packet 144 is to be replaced (e.g., indicator changes from green to red), (2) send a wireless notification message to a user's computing device indicating that the bait packet 144 is to be replaced, or both.

The pest may be a mouse, a rat, a squirrel, or another type of rodent. In some cases, the size of the components of the trap 100 may be scaled according to an average size of the type of pest being targeted. For example, a small version of the trap 100 may be used for mice and other smaller pests, a medium size version of the trap 100 may be used for rats and other medium-sized pests, and a large version of the trap 100 may be used for squirrels and other large-sized pests. For example, for capturing small rodents, the housing 102 may have a length (L) of between about 245 to 265 millimeters (mm), a width (W) of between about 90 to 100 mm, and a height (H) of between about 40 to 60 mm. To illustrate, in an embodiment to capture small rodents (e.g., mice), the housing 102 may have dimensions of approximately 253 mm (L)×86 mm (W)×53.5 mm (H) and the container 106 may have dimensions of approximately 167 mm (L)×50 mm (W)×47 mm (H). As another example, for capturing small rodents, the housing 102 may have a length (L) of between about 490 to 510 mm, a width (W) of between about 190 to 210 mm, and a height (H) of between about 100 to 120 mm.

The housing 102 may include one or more buttons, such as a network button 126 and a power button 128. The power button 128 may be used to power-on and power-off a circuit of the trap 100. The network button 126 may be used to initiate Bluetooth pairing, connect to a Wi-Fi network or other networking-related activities. The housing 102 may include a safety plunger 146 and a safety slit 148. A momentary-on switch may be located below the safety slid 148. For example, when the lid 104 is in the closed position, the safety plunger 146 may pass through the safety slit 148 and press on the momentary-on switch such that if the power button 124 has been pressed, closing the lid 104 causes the momentary-on switch to complete a circuit, providing power to a circuit of the trap 100 and placing the trap 100 in a power-on (e.g., armed) state. When the lid 104 is in the closed position, the safety plunger 146 may pass through the safety slit 148 and press on the momentary-on switch such that if the power button 124 has been pressed, closing the lid 104 causes the momentary-on switch to complete a circuit, providing power to a circuit of the trap 100 and placing the trap 100 in a power-on (e.g., armed) state. For example, a user may place the lid 104 in the open position, insert the container 106 into the receptacle 140 of the housing, press the power button 128 (causing the shutter 110 to go from an approximately vertical position to an approximately horizontal position, thereby opening the door 132), and place the lid 104 in the closed position, causing the safety switch 146 to turn on (e.g., arm) the trap 100. After a pest has entered into the container 106, the user may place the lid 104 in the open position, causing the safety switch 146 to retract from the safety slit 148, causing power to be shut off, turning off the trap 100. The user may remove and dispose of the container 106 that includes the dead pest.

The container 106 may be made out of plastic, paper, treated paper, impregnated with wax, impregnated with another substance, or any combination thereof. The container 106 may include (e.g., may be impregnated with) wax (or a wax layer) to prevent liquids from the dead pest to leak out. The container 106 may be treated (e.g., coated or infused with) chemicals to make the container 106 flame retardant. For example, the flame retardant chemicals may include Tetrabromobisphenol-A (TBBPA), aluminium hydroxide (ATH), magnesium hydroxide (MDH), huntite, hydromagnesite, various hydrates, red phosphorus, boron compounds (e.g., borates), organochlorines (e.g., chlorendic acid derivatives and chlorinated paraffins), organobromines (e.g., decabromodiphenyl ether (decaBDE), decabromodiphenyl ethane, polymeric brominated compounds such as brominated polystyrenes, brominated carbonate oligomers (BCOs), brominated epoxy oligomers (BEOs), tetrabromophthalic anyhydride, tetrabromobisphenol, hexabromocyclododecane (HBCD), organophosphates (e.g., triphenyl phosphate (TPP), resorcinol bis(diphenylphosphate) (RDP), bisphenol A diphenyl phosphate (BADP), and tricresyl phosphate (TCP)), phosphonates (e.g., dimethyl methylphosphonate (DMMP)), and phosphinates (e.g., aluminium diethyl phosphinate). The container 106 may be shipped in a substantially flat form. The edges of the container 106 may be creased to enable the container 106 to be opened from the flat form into the form illustrated in FIG. 1.

The container 106 may be capable of holding between at least 10 grams (g) to 40 g for trapping a mouse and may be capable of holding between at least 100 g to 700 grams for trapping a rat. When the door 132 is closed, causing a top 136 portion of the container 106 to come in contact with an strip 124 located at a top outer surface of the container 106, the container 106 may be capable of holding between at least 10 grams (g) to 40 g for trapping a mouse and may be capable of holding between at least 100 g to 700 grams for trapping a rat.

To arm the trap 100, a user may place the lid 104 in the open position and place the container 106 into the receptacle 140 of the housing 102 in such a way that the door 132 engages with the shutter 110.

The user may check a battery indicator of the indicators 128 to determine a battery level of one or more batteries. If the battery level is below a particular threshold, the user may replace the batteries with new (e.g., fully charged) batteries. For example, the battery indicator may be a multicolor light emitting diode (LED) or other indicator and may indicate green when the battery level is at least a first threshold voltage, indicate yellow when the battery level is less than the first threshold voltage but greater than or equal to a second threshold voltage, and indicate red when the battery level is below the second threshold voltage. The batteries may use zinc oxide, alkaline, or may be rechargeable (e.g., lithium ion, nickel cadmium, or the like).

The user may check a bait level indicator of the indicators 128 to determine an amount of (or amount remaining) of the bait packet 144. If the bait level is below a particular threshold, the user may replace the bait packet 144 with new bait. For example, the bait sensor may initiate a countdown timer when the bait packet 144 is initially inserted into the receptacle 118 and estimate a remaining life of the bait packet 144 (e.g., based on temperature and humidity). The bait packet 144 may include any type of olfactory-based attractant, such as a slow evaporation solid. The attractant may be infused with a scent that a particular type of pest finds attractive. For example, the scent may be that of a type of food (e.g., peanut oil, almond oil, or other nut-based oil) that the pest finds attractive or the scent may be that of a pheromone. The bait indicator may indicate green when the bait level is greater than or equal to a threshold amount and indicate red when the bait level is below the threshold amount, indicating to replace the bait packet 144.

Thus, the user may confirm that the shutter 110 in the horizontal position (or press the power button 124 to cause the shutter to move to the horizontal position), confirm that the battery indicator indicates the batteries have sufficient energy to power the trap 100, and confirm that the bait packet 144 has sufficient remaining amount to attract pests. The user may place the container 106 in the housing 102 with the door 132 engaging the shutter 110, close the lid 104, and place the trap 100 in an area where pest activity has been observed or where the user suspects one or more pests are present. At this point, the trap 100 is "armed" and ready to attract and electrocute a pest.

Thus, the trap 100 provides several advantages over conventional pest traps. First, the pest is quickly and humanely killed using electrocution. Second, the dead pest is automatically placed in the closed container 106, enabling easy disposal. The user does not view the dead pest and can quickly and easily dispose of the container 106 that includes the dead pest. Third, the trap 100 is able to detect the presence of a pest in the container 106 and sends a notification when a pest has been captured, enabling a user (e.g., a homeowner, an employee of a pest services company, or a maintenance employee of a commercial building) to determine when a pest has been caught, without requiring the user to periodically check the status of the trap 100. Fourth, the bait packet 144 is easily replaceable and lasts a long time (e.g., typically 3 to 6 months). The user does not have to perform a messy manual process to place bait (e.g., peanut butter) in the trap 100.

Figure 2A:
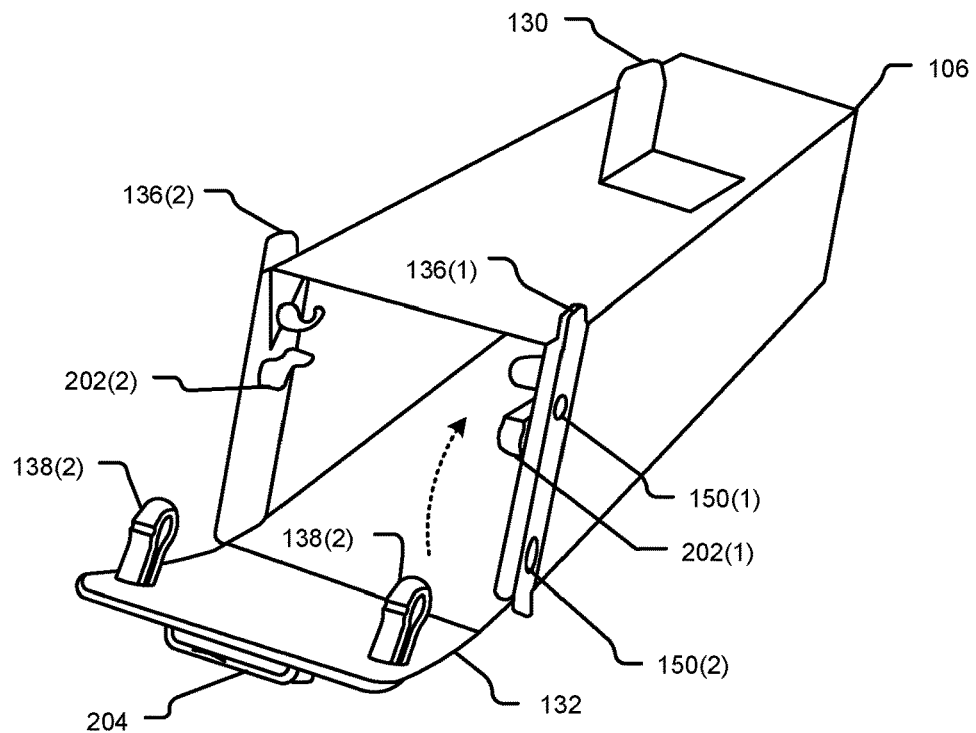
FIG. 2A is a block diagram illustrating a container with an open flap, according to some embodiments.
Figure 3:
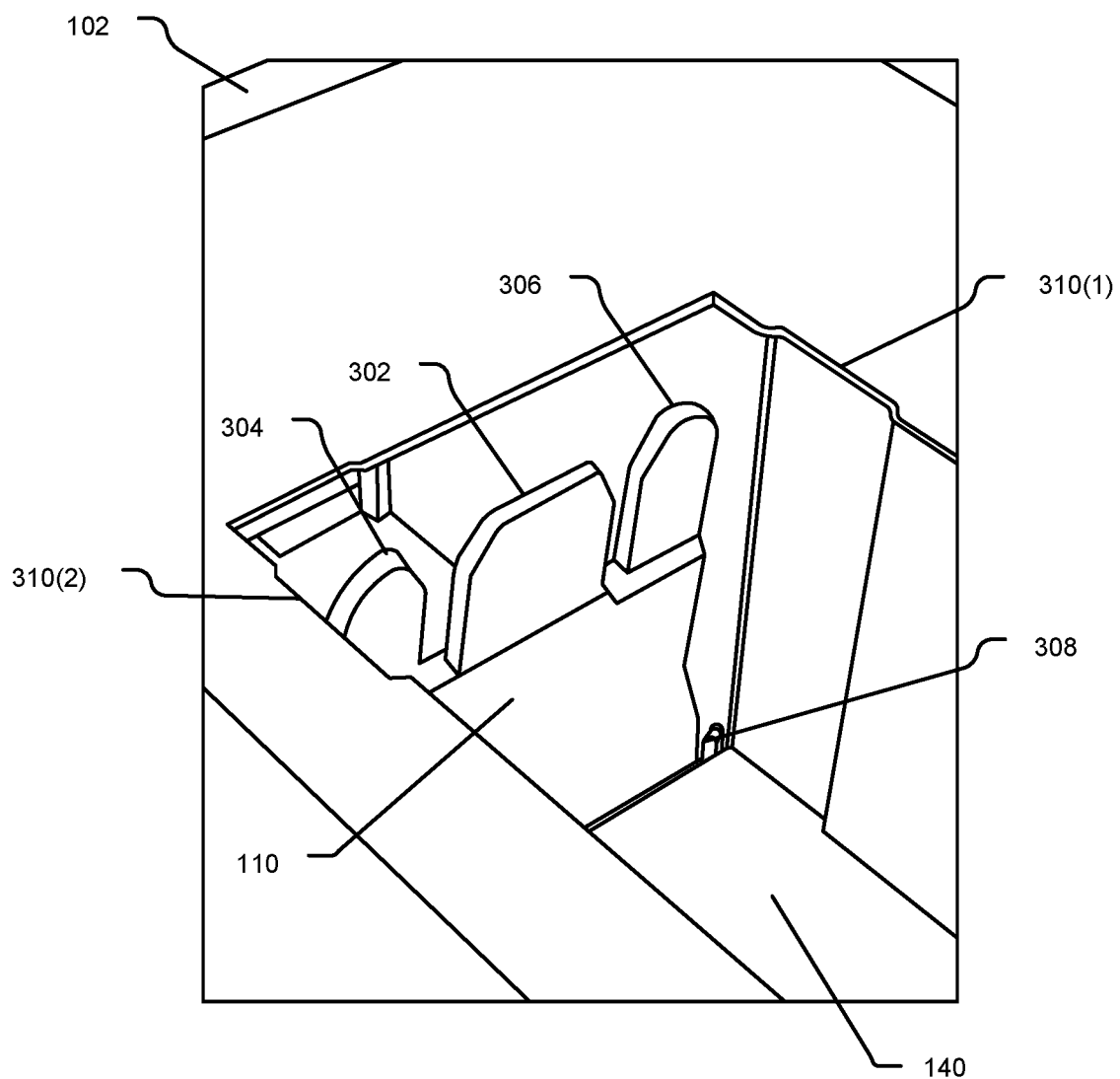
FIG. 3 is a block diagram illustrating a shutter of a trap, according to some embodiments.

FIG. 2A is a block diagram illustrating a container with an open flap, according to some embodiments. The container 106 may include the handle 130 that has an approximately 90-degree angle to a top surface of the container 106. The handle 130 may be used to hold the container 106 when placing the container 106 (e.g., when empty) in the housing 102 or when removing the container 106 from the housing 102 (e.g., after a pest has entered). The handle 130 may be attached to the top of the container 106 is using an adhesive (e.g., glue).

The container 106 may include the door 132. The door 132 may include the container latch strike 138(1), 138(2) on either side of an inner surface of the door 132. When the door 132 is closed (e.g., by the shutter 110 of FIG. 1 moving from a horizontal position to a vertical position), the container latch strike 138(1) may engage with container latch jaws 202(1) and the container latch strike 138(2) may engage with container latch jaws 202(2) to lock the door 132 in place and prevent the pest from exiting the container 106.

The door 132 of the container 106 may engage with a shutter 110 of the housing 102 via a lip 204 of the door 132, as illustrated herein (e.g., FIG. 4). The side braces 136(1), 136(2) may be located on either side of the opening of the container 106. The side braces 136 may be cardboard or plastic and may be glued or riveted to either side of the container 106. For example, the side brace 136(2) is illustrated in FIG. 2 as being attached to one side of the container 106 using the plastic or paper rivets 150(1), 150(2). The side braces 136 may be used to "key" the container 106 such that the container 106 can be placed into the housing 102 of FIG. 1 to enable the door 132 to engage with the shutter 110 and prevent the container 106 from being placed into the receptacle 140 with the door 132 at the opposite end (e.g., relative to the shutter 110) of the receptacle 140.

Figure 2B:
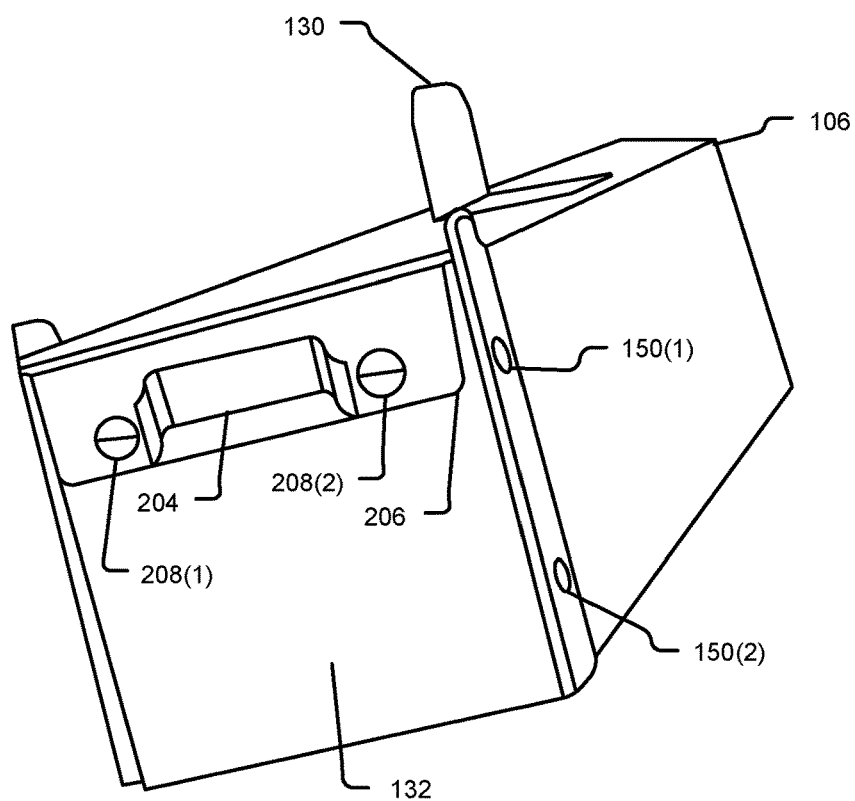
FIG. 2B is a block diagram illustrating a container with a closed flap, according to some embodiments.

FIG. 2B is a block diagram illustrating a container with a closed flap, according to some embodiments. When the door 132 is in the closed position, the container latch strikes 138(1), 138(2) of FIG. 2A may engage with the container latch jaws 202(1), 202(2), respectively, to prevent the door 132 from opening after the pest is inside the container 106.

The door 132 may include the lip 204 that is attached to the door 132 by a plate 206 using an adhesive, two rivets or screws 208(1), 208(2) (e.g., as illustrated in FIG. 2B), or both. The lip 204 may engage with a shutter 110 of the housing 102, as illustrated herein (e.g., FIG. 4).

FIG. 3 is a block diagram illustrating a shutter of a trap, according to some embodiments. The shutter 110 may include multiple prongs, such as, for example, a middle prong 302, a left prong 304, and a right prong 306. The middle prong 302 may slip through the lip 204 of FIG. 2B to engage the shutter 110, as illustrated herein (e.g., FIG. 4).

The shutter 110 may be controlled by a shutter hinge 804. The shutter hinge 804 may enable the shutter 110 to move approximately 90 degrees, e.g., from an approximately horizontal position to an approximately vertical position. The shutter hinge 804 may include a mechanical or an electro-mechanical mechanism to raise and lower the shutter 110. For example, the shutter hinge 804 may include a spring, a motor, or another type of mechanism. To illustrate, a spring may have tension and the shutter 110 may be held in the horizontal position by the spring. When a circuit of the trap 100 detects that a pest has entered into the housing 102, the trap 100 may cause the shutter hinge 804 to move, resulting in the shutter 110 moving from an approximately horizontal position (e.g., the trap 100 is armed) to an approximately vertical position (e.g., the trap 100 has been sprung and has captured a pest). When the shutter 110 moves from the approximately horizontal position to the approximately vertical position, the container latch strikes 138 may engage with the container latch jaws 202 of FIG. 2A to close the container 106 and prevent the door 132 from opening, thereby containing the pest in the container 106.

Orientation grooves 310(1), 310(2) may be located on either side of the receptacle 140 to accommodate the side braces 136 of the container 106 of FIG. 1. The side braces 136 may be used to "key" the container 106 such that the container 106 can be placed into the receptacle 140 to enable the door 132 to engage with the shutter 110 and prevent the container 106 from being placed into the receptacle 140 with the door 132 at the opposite end (e.g., relative to the shutter 110) of the receptacle 140. For example, the receptacle 140 may include the orientation grooves 310 into which the side braces 136 may slide, such that the container 106 can be placed into the receptacle 140 with an orientation in which the slide braces 136 slide into the orientation grooves 310, thereby enabling the door 132 to engage with the shutter 110.

Figure 4A:
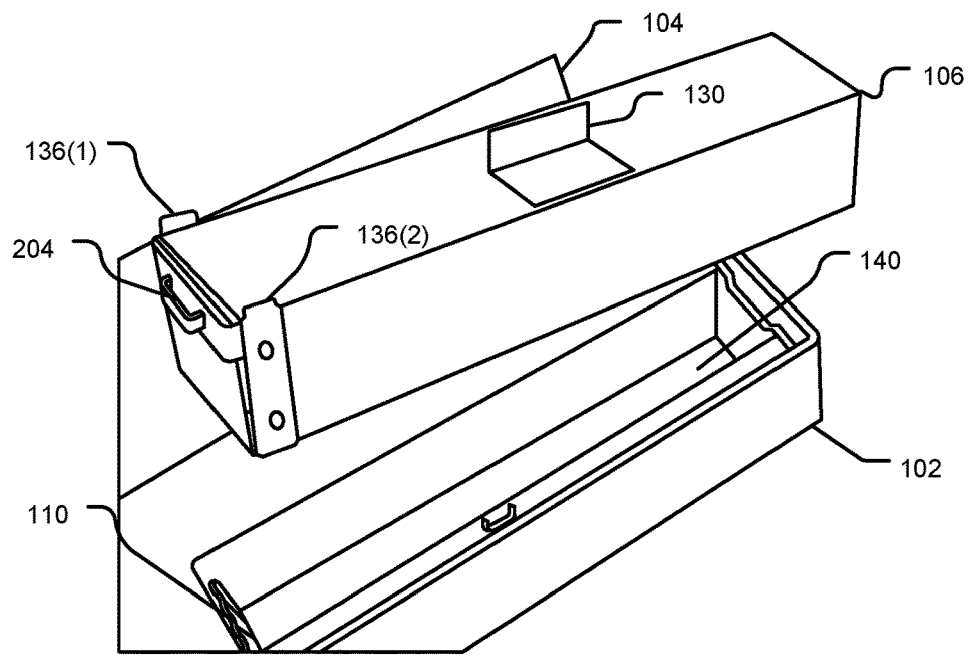
FIG. 4A is a block diagram illustrating placing a container in a trap, according to some embodiments.

FIG. 4A is a block diagram illustrating placing a container in a trap, according to some embodiments. To place the container 106 into the receptacle 140 of the housing 102, the user may hold the container 106 using the handle 130 and orient the container 106 such that the lip 204 is able to engage with the shutter 110 by positioning the lip 204 of the door 132 over the middle prong 302 of the shutter 110.

Figure 4B:
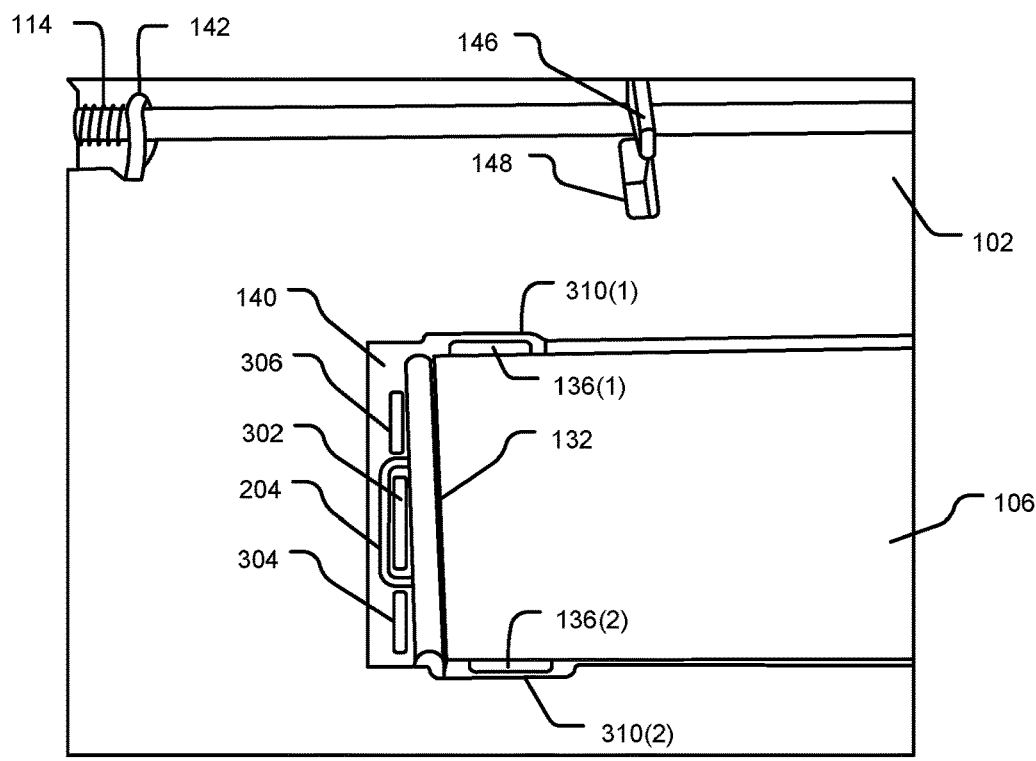
FIG. 4B is a block diagram illustrating the flap of the container engaging the shutter when a container is placed in a trap, according to some embodiments.

FIG. 4B is a block diagram illustrating the flap of the container engaging the shutter when a container is placed in a trap, according to some embodiments. As the user places the container 106 into the receptacle 140 of the housing 102, the side brace 136(1) may slide into the orientation groove 310(1) of the receptacle 140 and the side brace 136(2) may slide into the orientation groove 310(2) of the receptacle 140. In addition, the middle prong 302 slides into the lip 204, engaging the shutter 110. By engaging the shutter 110, the shutter 110 can move the door 132 of the container 106 from a vertical position (as illustrated in FIG. 4B) to a horizontal position to open the door 132 (e.g., to enable a pest to enter the container 106) and arm the trap 100. After a pest has entered into the container 106, the shutter 106 can close the door 132 to enable the container 106, along with the dead pest, to be easily disposed of, without the user having to view the dead pest.

Figure 5:
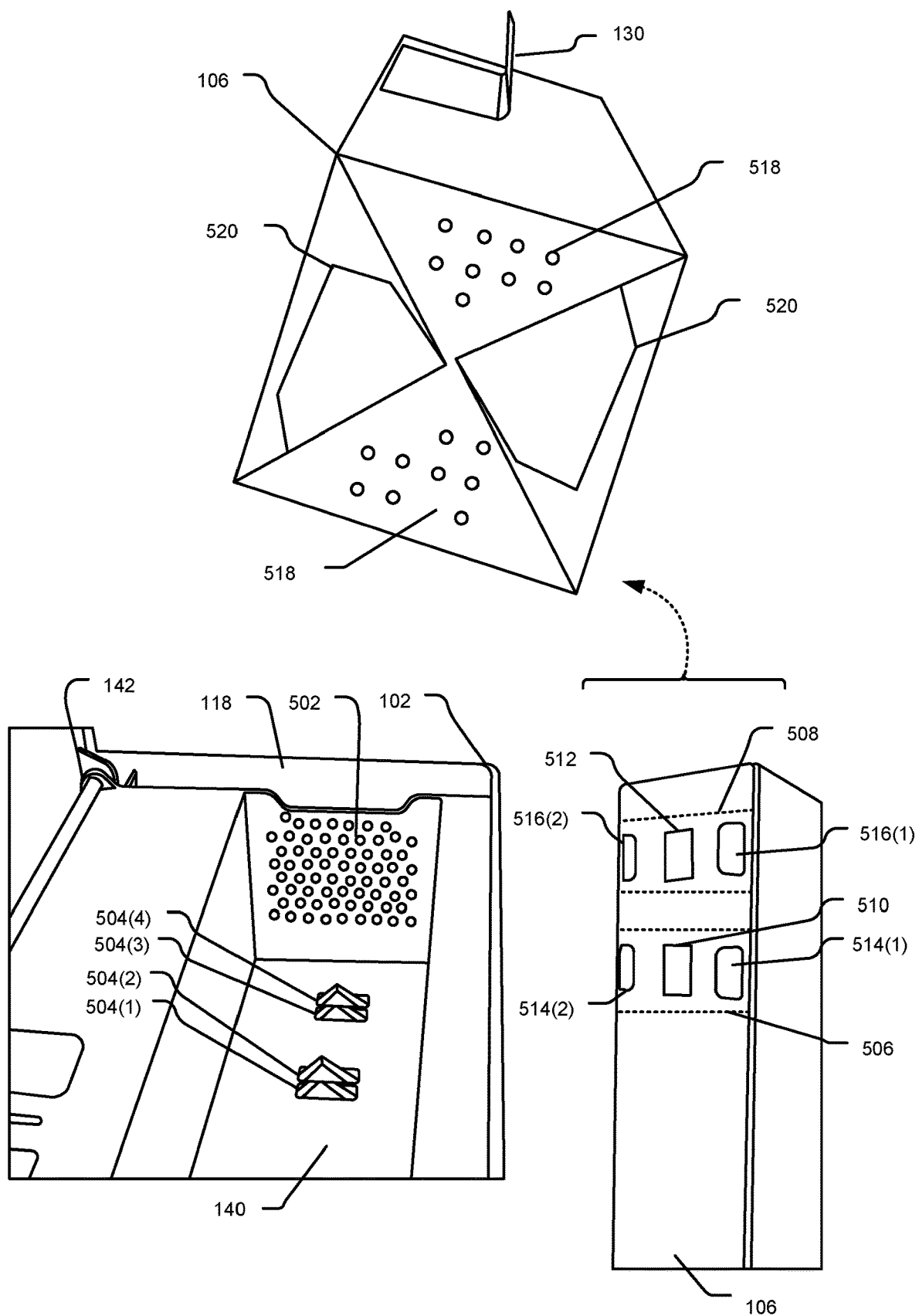
FIG. 5 is a block diagram illustrating the electrical connections and ventilation holes of the container and of the trap, according to some embodiments.

FIG. 5 is a block diagram illustrating the electrical connections and ventilation holes of the container and of the trap, according to some embodiments. The housing 102 may include multiple perforations 502. For example, when the bait packet 144 of FIG. 1 is placed in the bait receptacle 118, one side of the bait packet 144 may have a foil that can be removed (e.g., as illustrated in FIG. 9B) to enable the smell of the attractant to permeate the trap 100 to lure a pest into the trap 100. The housing 102 may include two pairs (e.g., four) electrical contacts 504(1), 504(2), 504(3), 504(4). A first pair of the electrical contacts 504, such as the contacts 504(2), 504(3) may be used to detect the presence of the container 106. For example, when the container 106 is placed in the receptacle 140, the container 160 may include metal plates (e.g., as described below) that enable the trap 100 to detect when the container 106 is present. A second pair of the electrical contacts 504, such as the contacts 504(1), 504(4) may be used to provide a high voltage and/or high current across two metal plates in the container 106 to electrocute and kill a pest in the container 106. Thus, the high voltage and/or high current may be provided using the contacts 504(1), 504(4) when the presence of the container 106 is detected using the contacts 504(2), 504(3). The high voltage and/or high current may not be provided using the contacts 504(1), 504(4) when the absence of the container 106 is detected using the contacts 504(2), 504(3). In this way, when the container 106 is not present, a user who touches the contacts 504(1), 504(4) does not receive the high voltage and/or high current because the absence of the container 106 is detected, thereby preventing a user from accidently being shocked.

Figure 18:
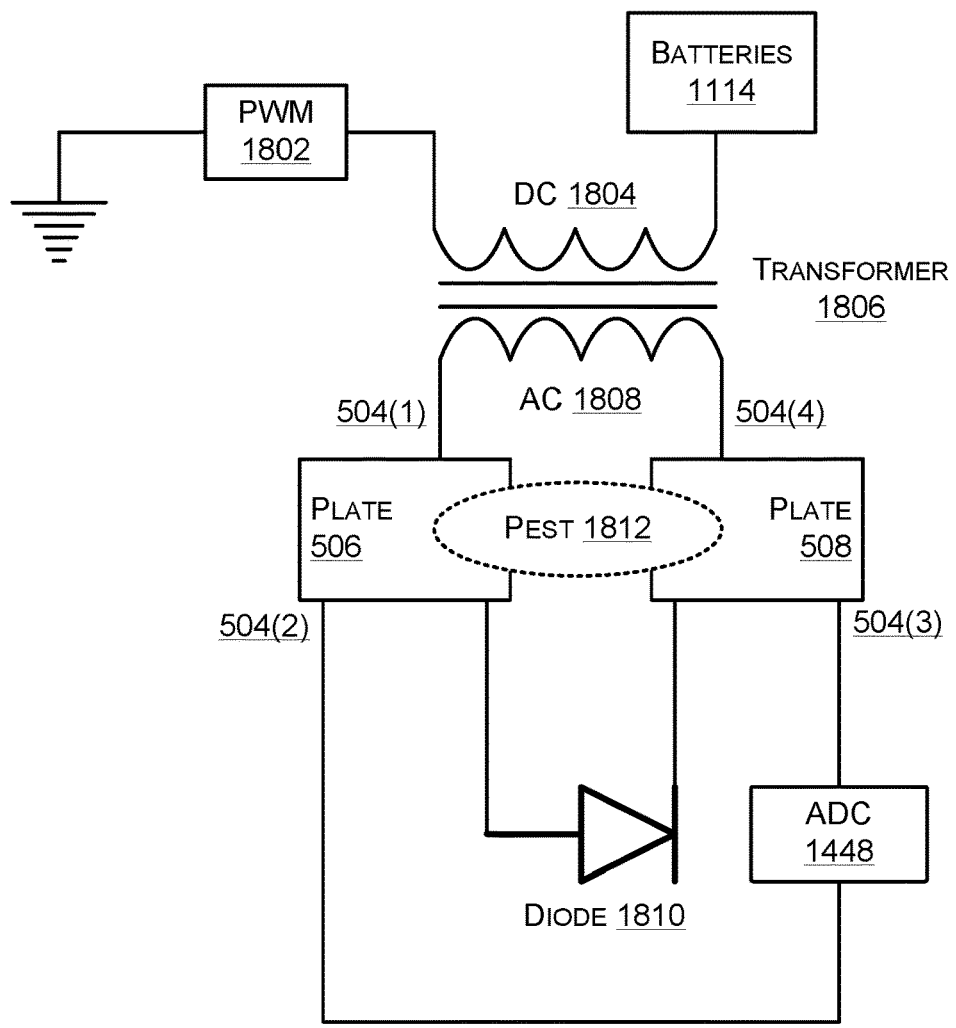
FIG. 18 is a block diagram illustrating a portion of a circuit to detect a presence of a pest, according to some embodiments.

The circuit in the housing 102 may detect the presence of the container 106 by measuring a voltage across the metal plates 506, 508 using a pair of the electrical contacts 504 (e.g., 504(2), 504(3)), as described in FIG. 18. For example, when the container 106 is absent, the voltage across the pair of the electrical contacts 504 (e.g., 504(2), 504(3)) pins may be measured as being very low. After the container 106 has been placed in the bait receptacle 118 in the correct orientation, the voltage across the pair of the electrical contacts 504 (e.g., 504(2), 504(3)) pins may be measured as being higher.

The container 106 may include a first metal plate 506 and a second metal plate 508. The metal plates 506, 508 may be partially exposed at the bottom of the container 106 to enable the metal plates 506, 508 to make contact with the contacts 504. For example, the metal plate 506 may have an exposed portion 510 and the metal plate 508 may have an exposed portion 512. The metal plates 506, 608 may have bends (e.g., crimps) on either side to hold the metal plates 506, 508 in place. For example, the metal plate 506 may have a bend 514(1) on one side and a bend 514(2) on the other side. The bends 514 may hold the metal plate 506 in place in the container 106. The plate 508 may have a bend 516(1) on one side and a bend 516(2) on the other side. The bends 516 may hold the metal plate 508 in place in the container 106.

When the container 106 is placed in the receptacle 140, the end of the container 106 that is nearest the perforations 502 of the housing 102 may include perforations 518 to enable the smell (e.g., fumes) of the attractant to enter into the container 106 when a bait packet is placed in the bait receptacle 118. The container 106 may be shipped in a collapsed (e.g., flat) form and when opened up, as illustrated in FIG. 5, flaps 520 may protrude out one end of the container 106.

A voltage with a particular amount of amperage may flow from one of the electrical contacts 504 to another of the electrical contacts 504. For example, the voltage and amperage may be sufficient to electrocute a pest, such as a mouse, a rat, a squirrel, or another type of rodent. One of the electrical contacts 504 may carry power (e.g., voltage) while one of the other electrical contacts 504 may be a ground or a negative. Thus, a pest entering the container 106 may complete a circuit, causing the power to flow between two of the electrical contacts 504 to electrocute the pest.

When the container 106 is placed in the housing 102, the metal plate 510 may touch the electrical contacts 504(1), 504(2) and the metal plate 512 may touch the electrical contacts 504(3), 504(4). A first pair of the electrical contacts 504 (e.g., 504(2), 504(3)) may be used to detect the presence of the container 106 in the receptacle 140. A second pair of the electrical contacts 504 (e.g., 504(1), 504(4)) may be used to electrocute a pest that enters into the container 106. The metal plates 510, 512 may be made out of thin metal (or another type of conductive material).

The housing 102 may include the perforations 502 on one wall of the receptacle 118 for the bait packet 144. The perforations 502 may enable a smell of the bait packet 144 to be diffused into the external environment to attract pests. In some cases, a small fan (e.g., a piezoelectric fan or other type of low power consumption fan with a noise of less than 30 decibels (db)) may be mounted in the housing 102 (e.g., between the bait receptacle 118 and the receptacle 140 for the container 106 to diffuse the smell of the bait packet 144 into the environment surrounding the housing 102.

Figure 6A:
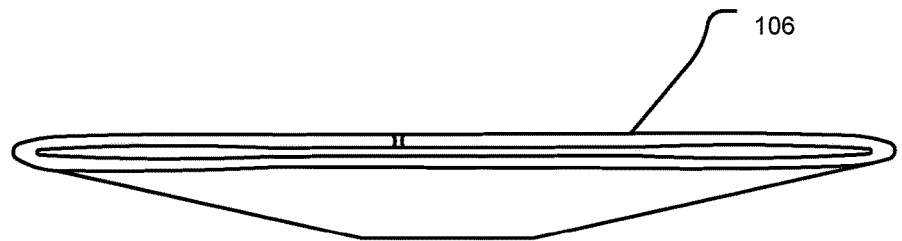
FIG. 6A is a block diagram illustrating a folded container, according to some embodiments.

FIG. 6A is a block diagram illustrating a folded container, according to some embodiments. The container 106 may be shipped flat to enable multiple folded containers to be placed in a package.

Figure 6B:
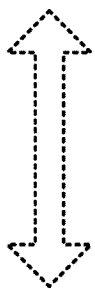
FIG. 6B is a block diagram illustrating an unfolded container, according to some embodiments.
Figure 6B:
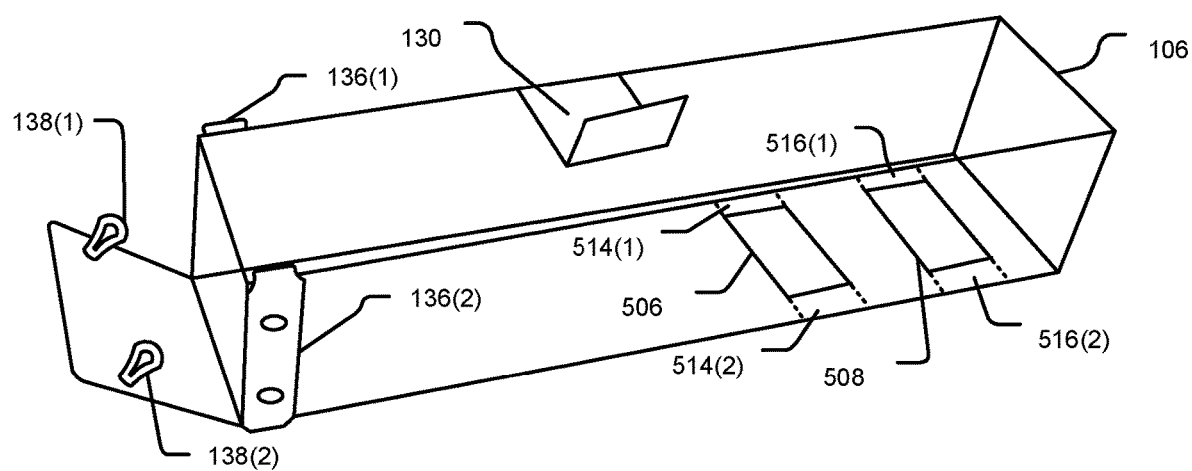

FIG. 6B is a block diagram illustrating an unfolded container, according to some embodiments. The container 106 shown folded flat in FIG. 6A can be unfolded to create a rectangular box, as illustrated in FIG. 6B. The metal plates 506, 508 are on an inner bottom of the container 106. The bends 514, 516 may keep the plates 506, 508, respectively, in place in the container 106.

Figure 7A:
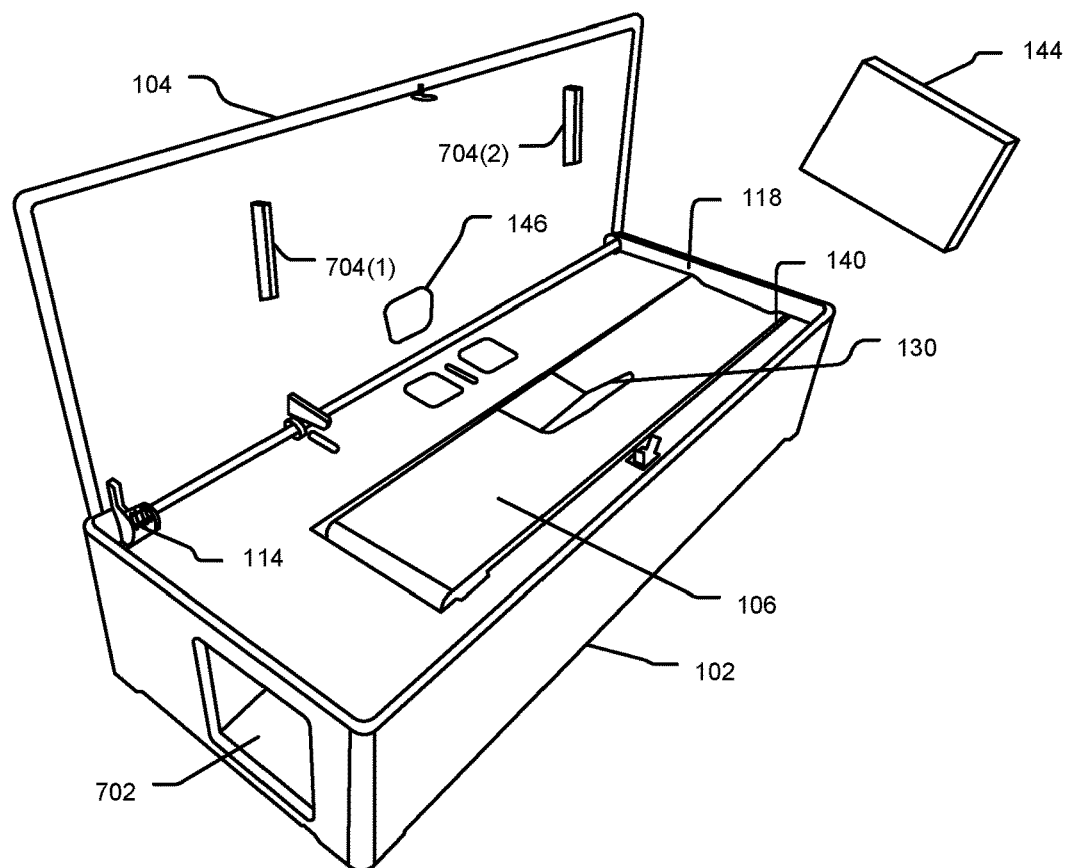
FIG. 7A is a block diagram illustrating a container placed in a trap, according to some embodiments.

FIG. 7A is a block diagram illustrating a container placed in a trap, according to some embodiments. In FIG. 7A, the container 106 is illustrated as being placed in the housing 102 (e.g., in the receptacle 140). The housing 102 may include an opening 702. The opening may be between about 30 mm to 40 mm on each side, and preferably about 36 mm×36 mm. After the bait packet 144 is placed in the bait receptacle 118, the smell of the attractant in the bait packet 144 may pass through the perforations 502 of the housing 102 and through the perforations 518 at the end of the container 106 nearest the bait packet 144, causing a pest to enter the opening 702 and into the container 106.

The lid 104 includes at least two protrusions 704(1) and 704(2) located on a bottom surface of the lid 104, such that when the lid 104 is closed, the protrusion 704(1) applies pressure to a front portion (e.g., nearest the opening 702) of the container 106 and the protrusion 704(1) applies pressure to a front portion (e.g., nearest the opening 702) of the container 106. The pressure applied by the protrusions 704 to the container 106 are designed to provide contact between the electrical contacts 504 of FIG. 5 and the exposed portions 510, 512 of the plates 506, 508, respectively.

Figure 7B:
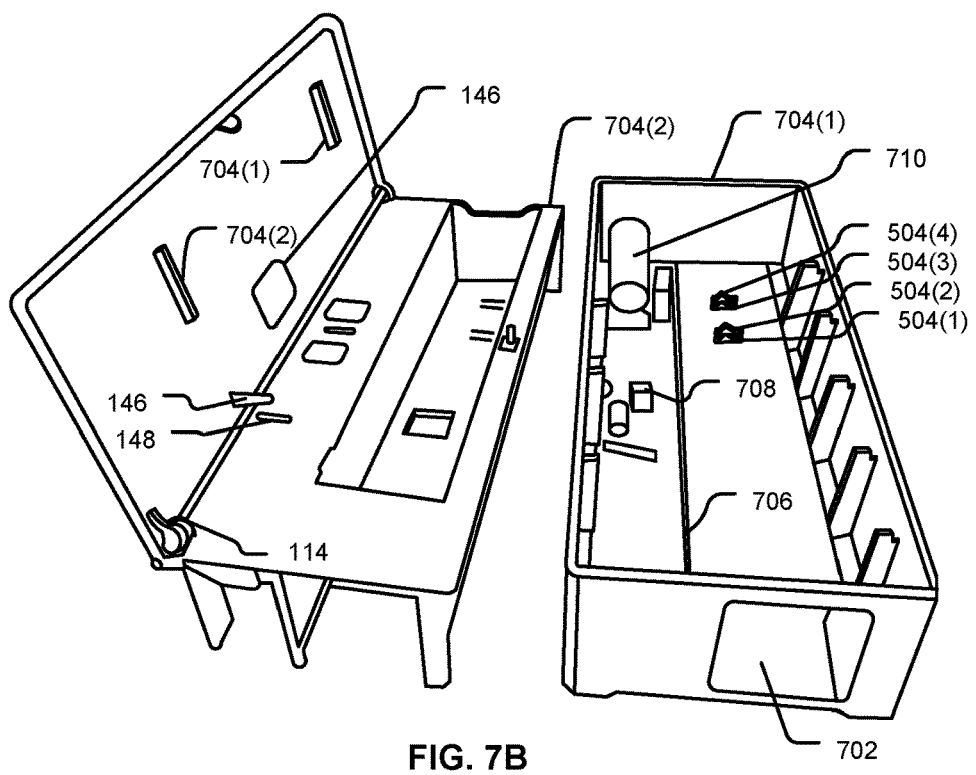
FIG. 7B is a block diagram illustrating a top portion and a bottom portion of a trap, according to some embodiments

FIG. 7B is a block diagram illustrating a top portion and a bottom portion of a trap, according to some embodiments. The housing 102 may be snapped together using two or more pieces. For example, as illustrated in FIG. 7B, the housing 102 may include a bottom portion 704(1) and a top portion 704(2) that can be snapped together.

Figure 15:
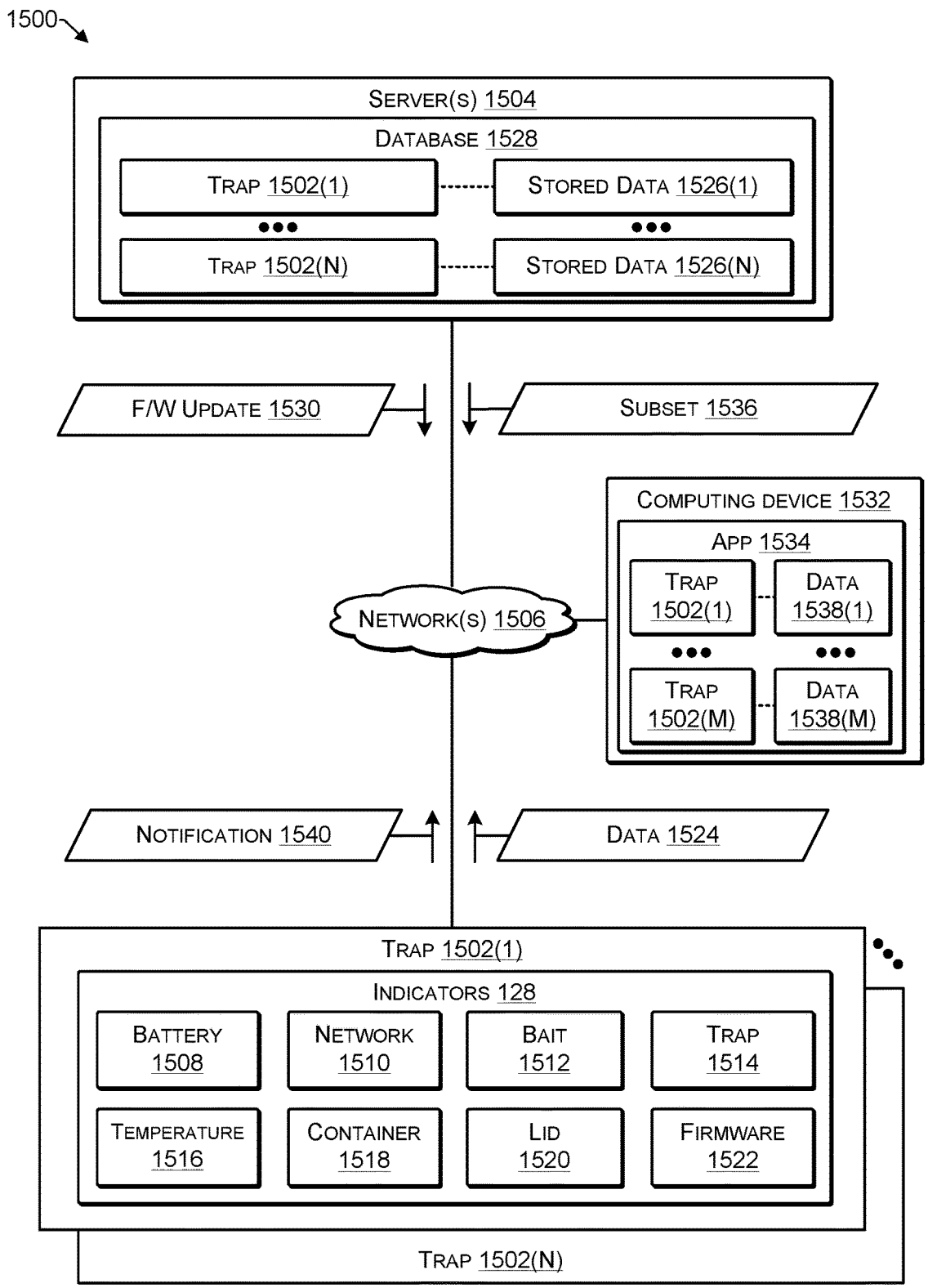
FIG. 15 illustrates a system diagram that includes multiple traps sending data to a server, according to some embodiments.

The bottom portion 704(1) may include a circuit board 706 that includes various components of the trap 100, such as a processor, a memory storing instructions, a wireless interface, and the like, as described in more detail in FIG. 15. The circuit board 706 may include a safety switch 708. When the lid 104 is in the closed position, the safety plunger 146 may pass through the safety slit 148 and make contact with the safety switch 708. For example, the safety switch 708 may be a momentary-on switch, such that opening the lid 104 causes the safety plunger 146 to release the safety switch 708, opening the circuit to prevent electricity from flowing to the electrical contacts 504.

The circuit board 706 may include a capacitor 710. The capacitor 710 may be used to store and step-up power (e.g., voltage and/or current) to provide a large jolt of power to a pair of the electrical contacts 504 to electrocute a pest.

Figure 8A:
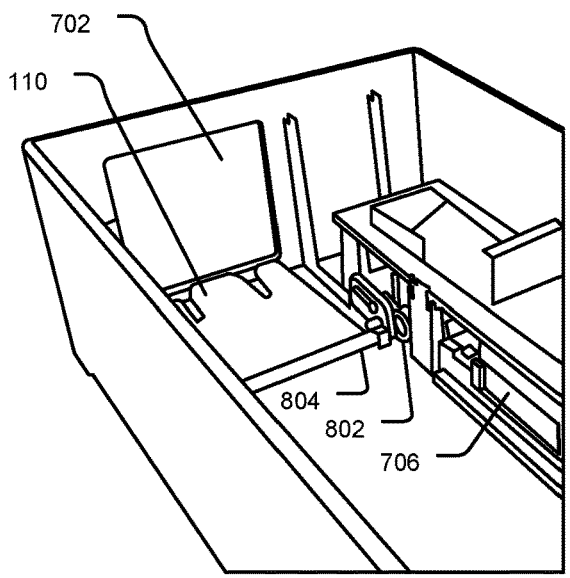
FIG. 8A is a block diagram illustrating a shutter in an open position, according to some embodiments.

FIG. 8A is a block diagram illustrating a shutter in an open position, according to some embodiments. A shutter motor 802 may be capable of moving the shutter 110 from an approximately horizontal position (e.g., as illustrated in FIG. 8A) to an approximately vertical position (e.g., as illustrated in FIG. 8C). The shutter 110 may move from the approximately horizontal position to the approximately vertical position using a hinge 804. FIG. 8A illustrates the approximately horizontal position of the shutter 110 when the trap 100 is open (e.g., armed) and ready for a pest to enter into the opening 110.

Figure 8B:
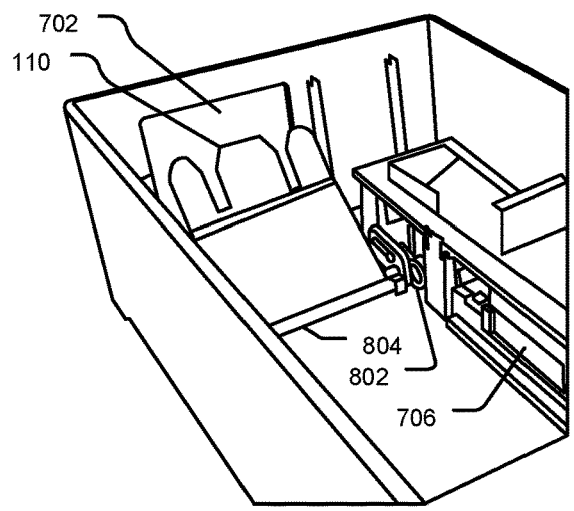
FIG. 8B is a block diagram illustrating a shutter in a partially closed position, according to some embodiments.
Figure 8C:
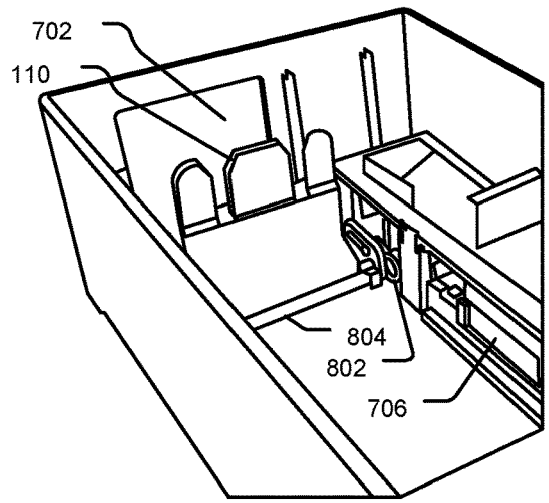
FIG. 8C is a block diagram illustrating a shutter in a fully closed position, according to some embodiments.

FIG. 8B is a block diagram illustrating a shutter in a partially closed position, according to some embodiments. After a pest has entered into the trap via the opening 702 and into the container 106 of FIG. 1, the pest may be electrocuted because the pest completes the circuit between the metal plates 506, 508, causing a large amount of power, sufficient to kill the pest, to travel from one of the metal plates to the other. When the circuit detects the surge of power caused by the pest completing the circuit, the circuit may provide power to the motor 802, causing the shutter 110 to move from the approximately horizontal position. During the transition from the approximately horizontal position to the approximately vertical position, the shutter 110 may be at an angle of approximately 45 degrees relative to the bottom of the trap 100, as illustrated in FIG. 8B.

FIG. 8C is a block diagram illustrating a shutter in a fully closed position, according to some embodiments. After a pest has entered into the trap via the opening 702 and into the container 106 of FIG. 1, the pest may be electrocuted because the pest completes the circuit between the metal plates 506, 508, causing a large amount of power, sufficient to kill the pest, to travel from one of the metal plates to the other. When the circuit detects the surge of power caused by the pest completing the circuit, the circuit may provide power to the motor 802, causing the shutter 110 to move from the approximately horizontal position to the approximately vertical position (e.g., in which the shutter 110 is about perpendicular to the bottom of the trap 100), as illustrated in FIG. 8C.

Thus, the shutter hinge 804 may enable the shutter 110 to move approximately 90 degrees, e.g., from an approximately horizontal position to an approximately vertical position. The shutter hinge 804 may include a mechanical or an electro-mechanical mechanism to raise and lower the shutter 110. For example, the shutter hinge 804 may include a spring, a motor, or another type of mechanism. To illustrate, a spring may have tension and the shutter 110 may be held in the horizontal position by a latch. When the trap 100 detects that a pest has entered into the housing 102, the trap 100 may cause the latch to release, resulting in the shutter 110 moving from an approximately horizontal position (e.g., the trap 100 is armed) to an approximately vertical position (e.g., the trap 100 has been sprung and has captured a pest). The latch may be electro-mechanical, magnetic, electromagnetic, or the like. For example, the latch may physically hold the shutter 110 in a horizontal position. When electricity is applied to the latch, the latch may move to release the shutter 110, causing a spring mechanism (e.g., part of the shutter hinge 804) to pull the shutter 110 from the horizontal position to a vertical position. As another example, the latch may be electromagnetic and, when electricity is applied, attract a metal plate on the shutter 110 to hold the shutter 110 in a horizontal position. When the electricity is stopped to the latch, the latch may release the shutter 110, causing a spring mechanism (e.g., part of the shutter hinge 804) to pull the shutter 110 from the horizontal position to a vertical position. In some cases, the latch may not be present. In such cases, the shutter 110 may be held in a horizontal position by gravity and when electricity is applied to a stepper motor (e.g., in the shutter hinge 804), the shutter 110 may move from the horizontal position to a vertical position.

Figure 9A:
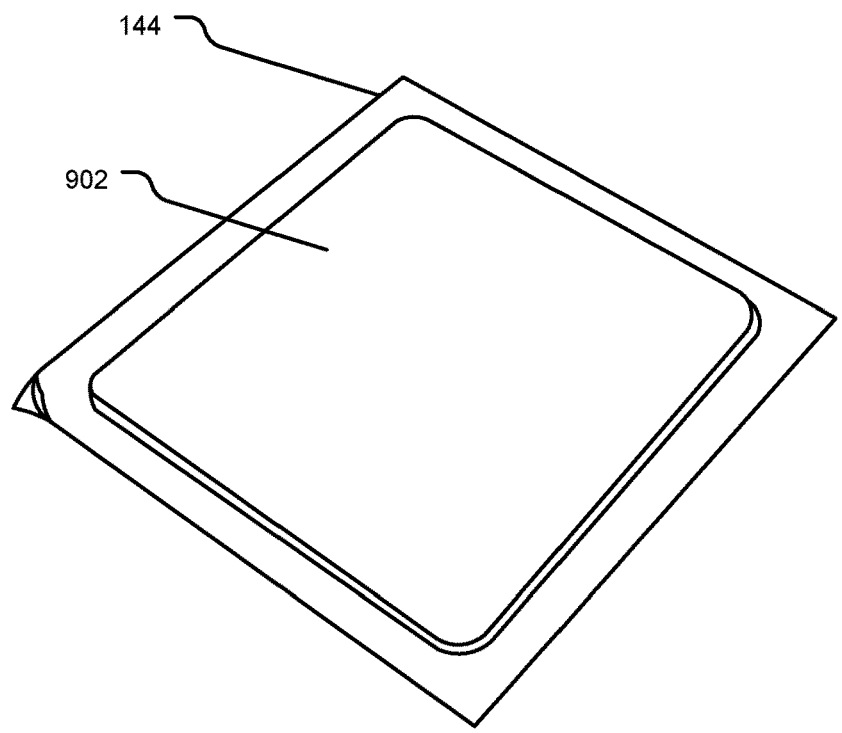
FIG. 9A is a block diagram illustrating a top portion of an attractant packet, according to some embodiments.
Figure 9B:
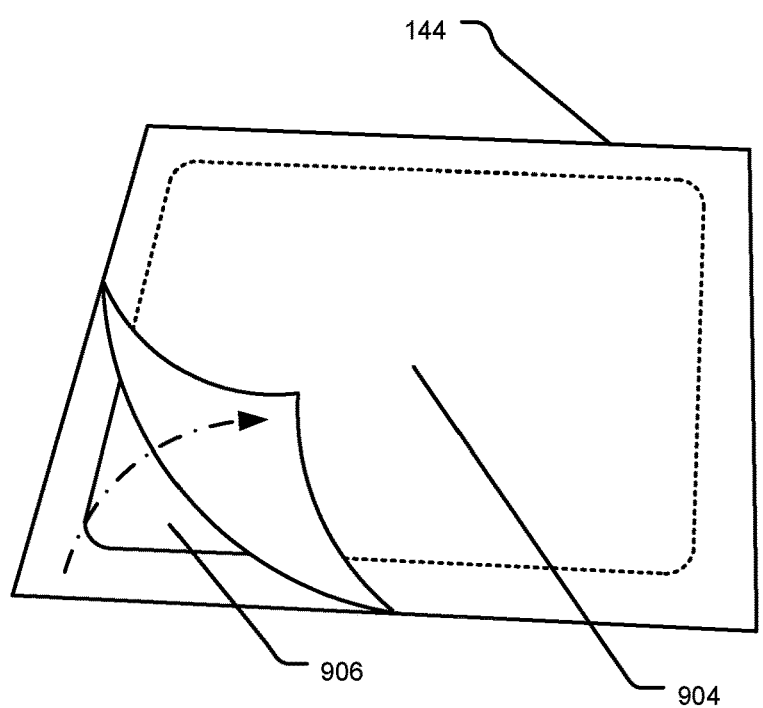
FIG. 9B is a block diagram illustrating a bottom portion of an attractant packet with a removable foil surface, according to some embodiments.

FIG. 9A is a block diagram illustrating a top portion of a bait packet, according to some embodiments. When viewing the bait packet 144 from a top of the bait packet 144, an attractant 902 may be visible.

FIG. 9B is a block diagram illustrating a bottom portion of a bait packet with a removable foil surface, according to some embodiments. The bait packet 144 may be sold in a sealed form. Before placing the bait packet 144 into the bait receptacle 118, the user may peel off a layer 904 (e.g., a thin foil or plastic layer), as illustrated in FIG. 9B, to create exposed attractant 906. FIG. 9B illustrates partial removal of the layer 904. The user may remove the entire layer 904 to create the exposed attractant 906 before placing the bait packet into the bait receptacle 118.

Figure 10A:
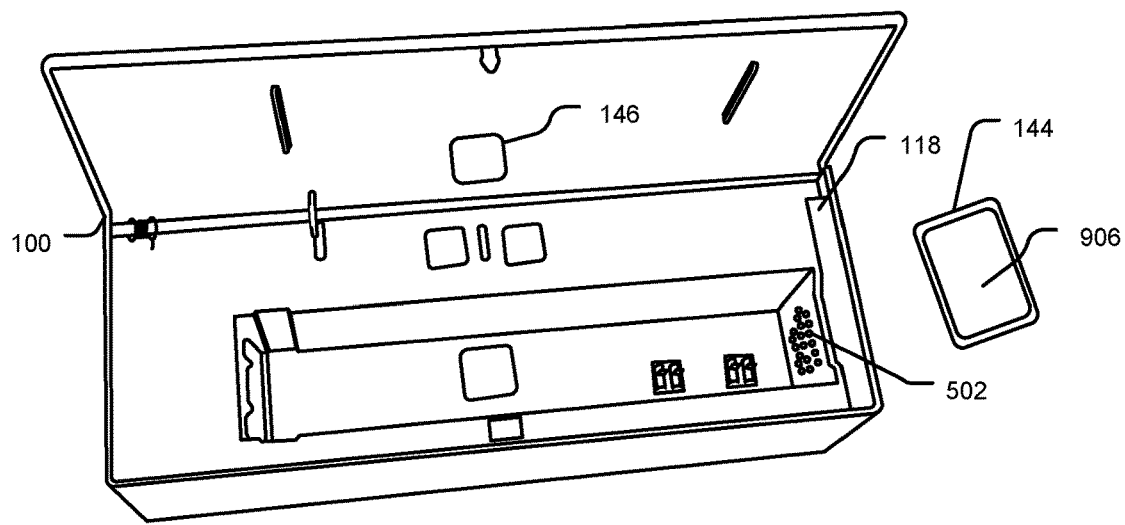
FIG. 10A is a block diagram illustrating a bait packet before it is placed in an attractant receptacle of a trap, according to some embodiments.

FIG. 10A is a block diagram illustrating an attractant packet before it is placed in an attractant receptacle of a trap, according to some embodiments. The user may remove the layer 904 of FIG. 9B of the bait packet 144 to create the exposed attractant 906.

Figure 10B:
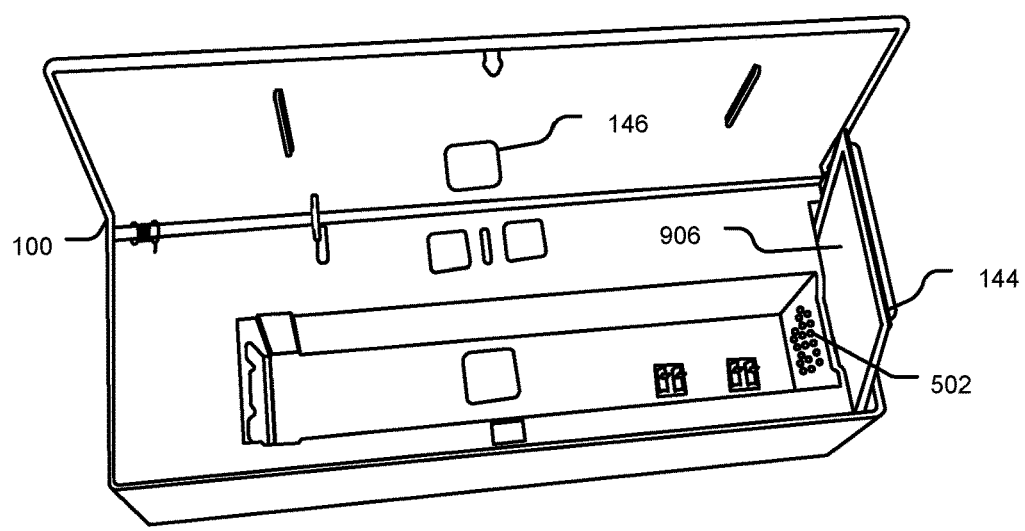
FIG. 10B is a block diagram illustrating a bait packet that is partially placed in an attractant receptacle of a trap, according to some embodiments.

FIG. 10B is a block diagram illustrating an attractant packet that is partially placed in an attractant receptacle of a trap, according to some embodiments. The user may slide the bait packet 144 into the bait receptacle 118. The shape of the bait receptacle 118 may have a particular shape (e.g., U-shape) to accommodate only one orientation of the bait packet 144. For example, the bait receptacle 118 may have a shape that enables the bait packet 144 to be placed into the bait receptacle 118 with the exposed attractant 906 facing the perforations 502. The bait receptacle 118 may have a shape that prevents the bait packet 144 from being placed into the bait receptacle 118 with the exposed attractant 906 facing away from the perforations 502.

Figure 10C:
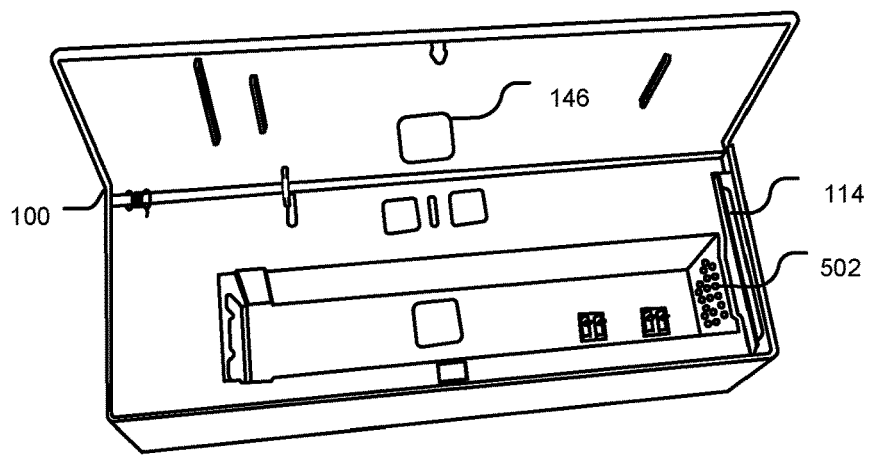
FIG. 10C is a block diagram illustrating a bait packet after it is placed in an attractant receptacle of a trap, according to some embodiments.

FIG. 10C is a block diagram illustrating an attractant packet after it is placed in an attractant receptacle of a trap, according to some embodiments. After placing the bait packet 144 into the bait receptacle 118 with the exposed attractant 906 facing the perforations 502, the trap 100 may appear as illustrated in FIG. 10C.

Figure 11:
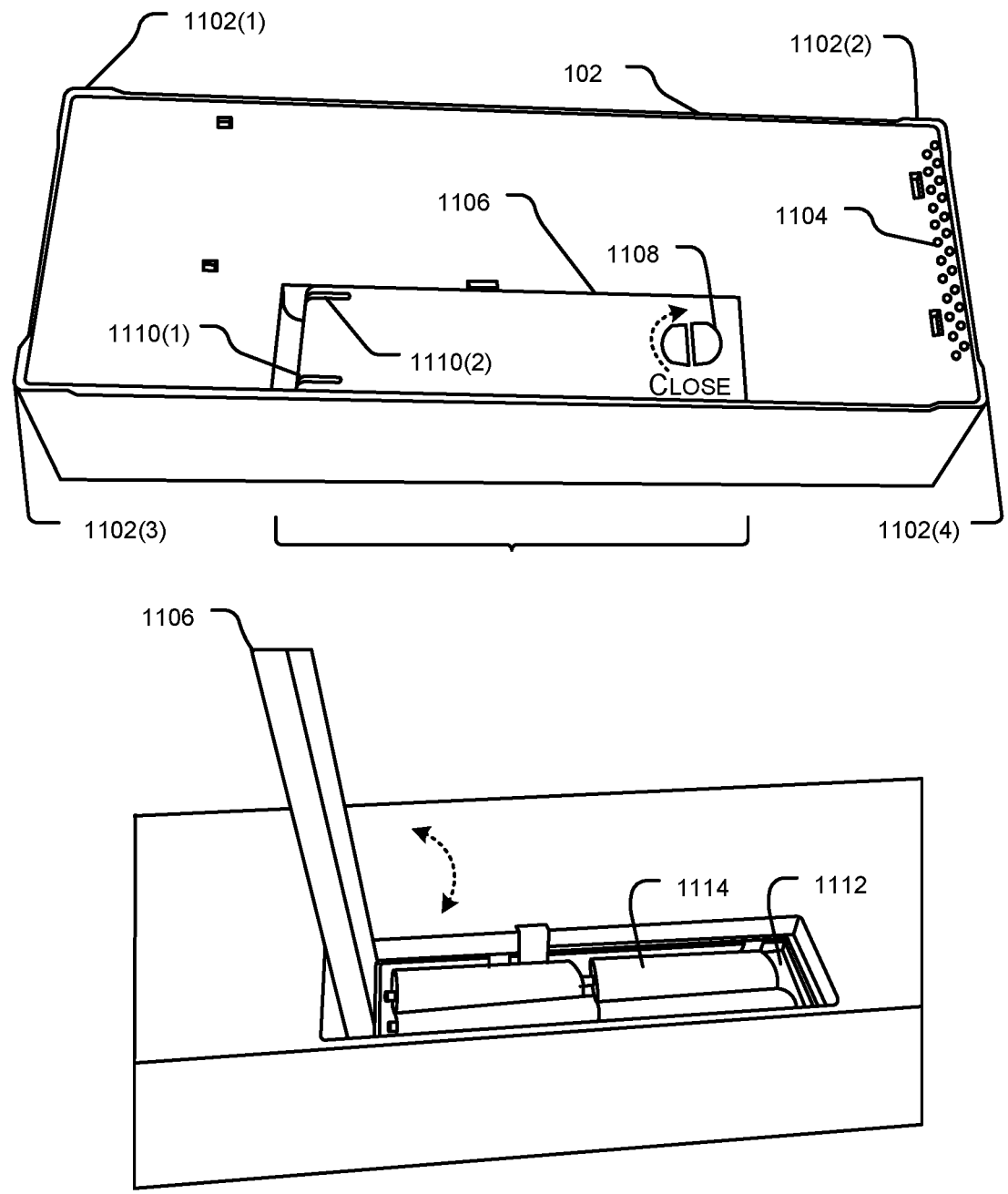
FIG. 11 is a block diagram illustrating a bottom of the housing, according to some embodiments.

FIG. 11 is a block diagram illustrating a bottom of the housing, according to some embodiments. The bottom portion of the housing 102 may include 4 raised feet 1102(1), 1102(2), 1103(3), 1104(4) located at each of the four corners of the bottom surface of the housing 102. Drain holes 1104 may be located at least at one end of the bottom of the housing 102, as illustrated in FIG. 11. Of course, in some cases, the drain holes 1104 may be located anywhere along the bottom surface of the housing 102. The drain holes 1104 may enable a liquid (e.g., moisture or water) that has entered into the housing 102 to drain out. For example, if the trap housing 102 is placed in a basement, a garage, or another location that can be damp or is subject to water ingress, any moisture or water entering into the housing will drain out from the drain holes 1104 due to the height of the raised feet 1102.

A battery compartment lid 1106 may be opened to remove existing batteries and replace them with new batteries. For example, battery compartment lid 1106 may slide and use a detent-snap feature to keep the battery compartment lid 1106 in place. The rib and the two recessed pockets are only there to help you slide it sideways. The battery compartment lid 106 may swing open through the use of one or more hinges, such as hinges 1110(1), 1110(2). When the battery compartment lid 1106 is opened, a battery compartment 1112 may include one or more batteries 1114. The batteries 1114 may be a 9-volt battery, 2 or 4 AA batteries, 2 or 4 AAA batteries, or another type of battery. By using battery power instead of power from a power supply that taps into the power grid, the housing 102 can be placed in areas where a 110-volt or 220-volt wall socket may not be easily accessible, such as, for example, a garage, an attic, a basement, or the like. The battery compartment may be located below the circuit board 706 of FIG. 7.

Figure 12A:
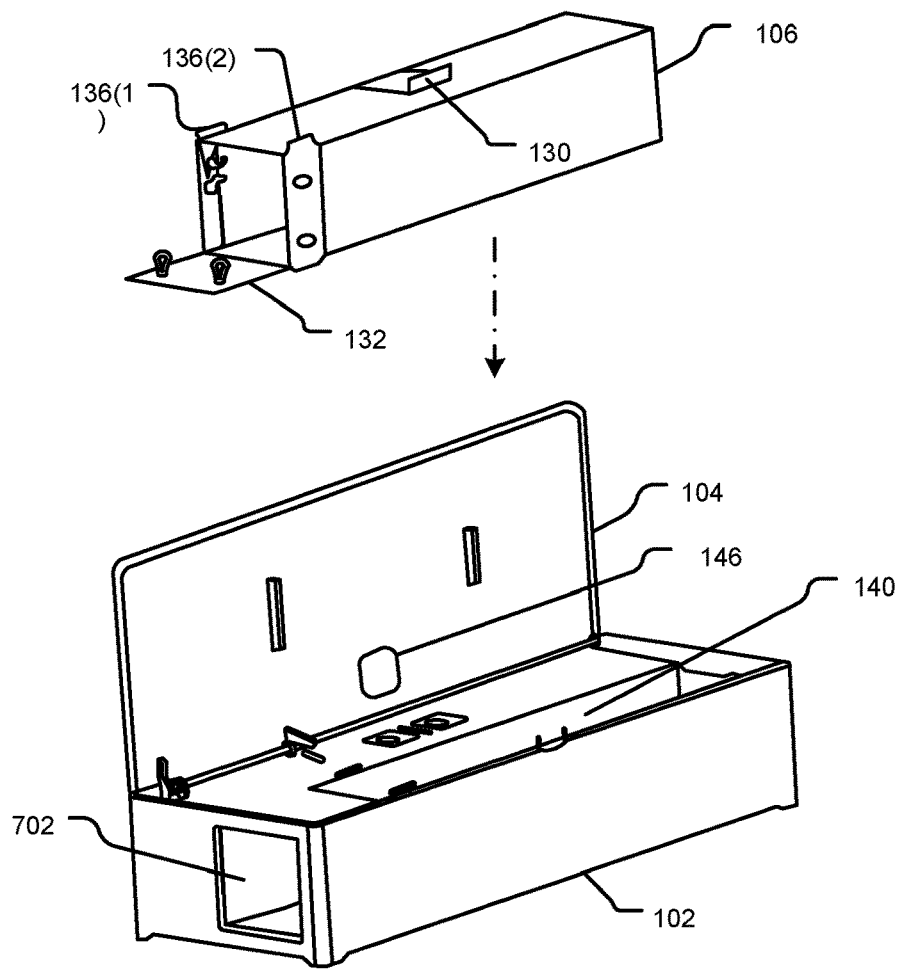
FIG. 12A is a block diagram illustrating a container before it is placed in a trap, according to some embodiments.

FIG. 12A is a block diagram illustrating a container before it is placed in a trap, according to some embodiments. FIG. 12A illustrates how, after the lid 104 is opened, the container 106 may be oriented (e.g., with the door 132 facing the opening 702) and lowered into the receptacle 140 of the housing 102.

Figure 12B:
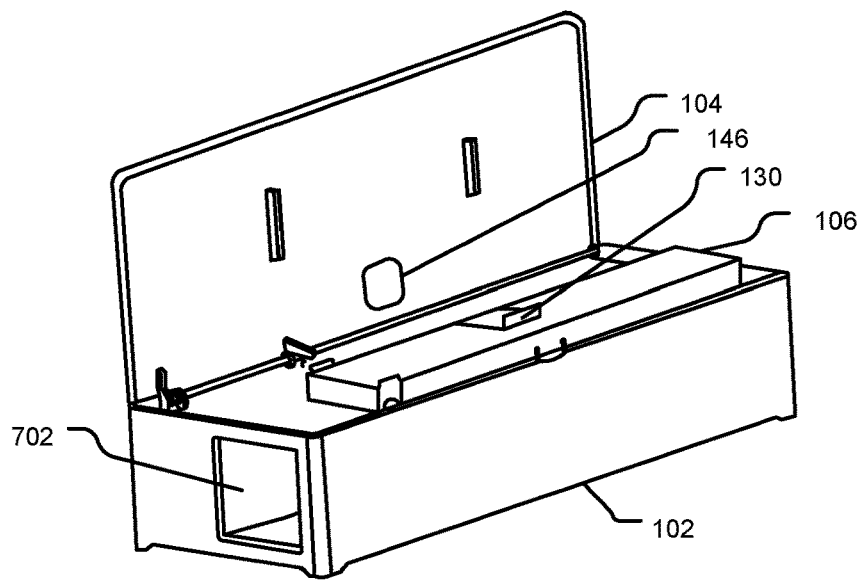
FIG. 12B is a block diagram illustrating a container partially placed in a trap, according to some embodiments.

FIG. 12B is a block diagram illustrating a container partially placed in a trap, according to some embodiments. FIG. 12B illustrates the container 106 being lowered into the receptacle 140 of the housing 102 while the lid 104 is open.

Figure 13A:
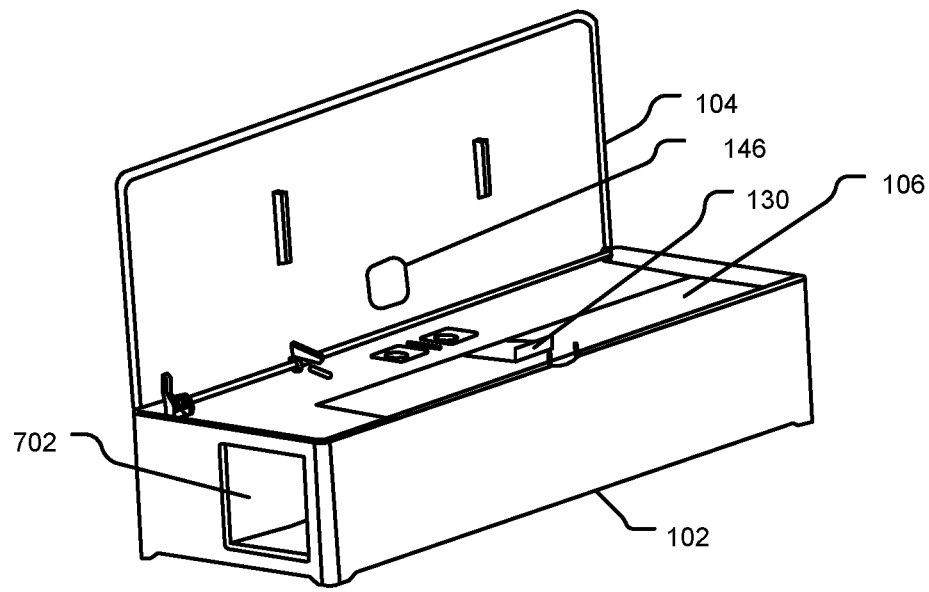
FIG. 13A is a block diagram illustrating a container after it is placed in a trap with an open lid, according to some embodiments.

FIG. 13A is a block diagram illustrating a container after it is placed in a trap with an open lid, according to some embodiments. FIG. 13A illustrates the container 106 completely lowered into the receptacle 140 of the housing 102 while the lid 104 is open.

Figure 13B:
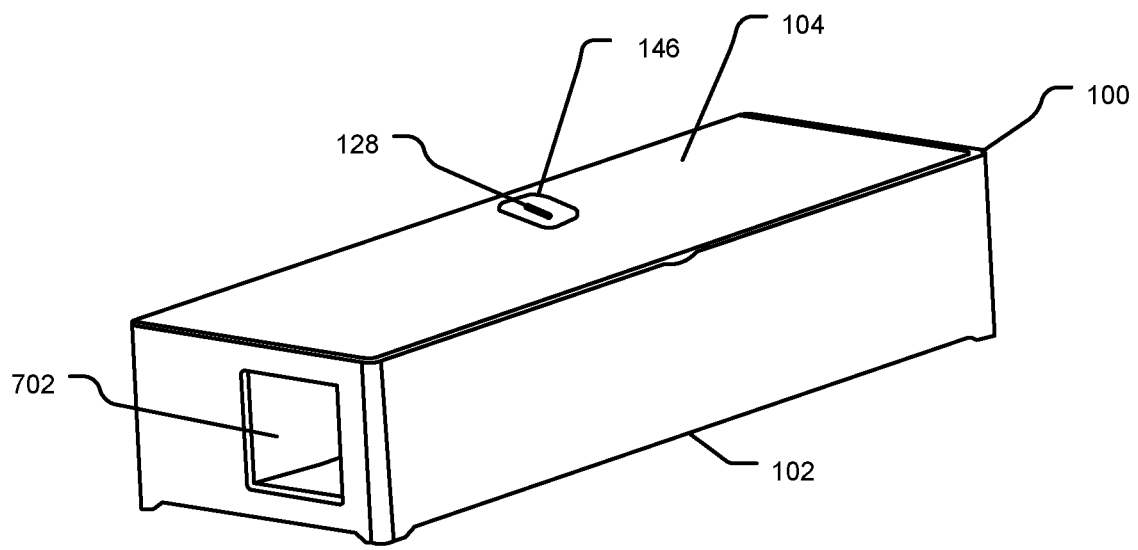
FIG. 13B is a block diagram illustrating a container after it is placed in a trap with a closed lid, according to some embodiments.

FIG. 13B is a block diagram illustrating a container after it is placed in a trap with a closed lid, according to some embodiments. FIG. 13B illustrates how after the container 106 is lowered into the receptacle 140 of the housing 102, the lid 104 may be closed. The user can see the status of the trap 100 by observing the various indicator lights 128 (e.g., wireless connection, power on/off, battery strength, and the like) through the transparent window 146.

Thus, the circuit board 706 in the housing 102 may determine the level of the batteries 1114 and display the battery level using a battery level indicator of the indicators 128. The circuit board 706 in the housing 102 may determine (e.g., estimate) a remaining amount of the bait packet 144 and display the bait level using a bait level indicator of the indicators 128. The circuit board 706 in the housing 102 may determine a strength of a wireless connection (e.g., Wi-Fi, Bluetooth, ZigBee, or the like) and display the wireless signal strength using a network connection indicator of the indicators 128. The circuit 706 may be printed circuit board (PCB) with a logic device, embedded controller, or a processor configured with specific instructions to perform the various functions described herein.

The circuit 706 may be located in a compartment within a bottom portion of the housing 102. The circuit 706 may receive power from the batteries 1114 and may be connected to, monitor, and control the shutter hinge 804, and the electrical connectors 504. After the circuit 706 determines that a pest has entered in the container 106 by spanning the plates 510, 512, the circuit 706 may cause the shutter 110 to close, e.g., move from a substantially horizontal position to a substantially vertical position. The circuit 706 may cause the latch 132 to release the shutter 110 (e.g., when the shutter hinge 804 includes a spring that has tension when the shutter 110 is placed in the substantially horizontal position). As another example, the circuit 706 may cause a stepper motor in the shutter hinge 804 to move the shutter 110 from the horizontal position to the vertical position. The circuit 706 may monitor a resistance (or capacitance) of the contacts 128 (that are connected to two metal plates located inside the container 106) to determine if a pest has entered the container 106.

When the trap 100 is powered-on and the lid 104 is closed, the circuit 706 may cause power from the battery 116 to be available at a pair of the electrical contacts 504. A high voltage boost circuit portion of the circuit 706 may cause the voltage from the battery to be stepped-up (e.g., increased) to a level sufficient to electrocute a pest. For example, the power circuit portion of the circuit 706 may provide between 5 kilovolts (kV) and 100 kV at between 5 to 25 microamperes (mA) depending on the type of pest targeted by the trap 100. For example, for a mouse, the high voltage may be provided at between about 7 kV to 10 kV. The high voltage boost circuit may provide voltage through a pair of the contacts 504 to electrically conductive plates 506, 508 inside an inner bottom surface of the container 106 to electrocute the pest.

After a pest, attracted by the scent emanating from the bait packet 144, enters the trap 100 through the opening 702 and enters into the container 106, the pest may close a circuit between the plates 510, 512, that are in contact with a pair of the electrical contacts 504 (e.g., 504(1), 504(4)), causing the trap 100 to detect the pest. The trap 100 may use the high voltage boost circuit to provide a high voltage across the plates 510, 512, causing the high voltage to flow through the body of the pest, electrocuting and killing the pest. The high voltage may be provided for a predetermined amount of time, such as at least 3 seconds for a mouse.

In response to the circuit 706 detecting the pest, the circuit 706 may cause the shutter 110 to close, e.g., move from a substantially horizontal position to a substantially vertical position. When the shutter 110 moves from the substantially horizontal position to the substantially vertical position, the shutter 110 may move the door 132 of the container 106 from a substantially horizontal position to a substantially vertical position, causing the latch strikes 138 to enter into the latch jaws 202, and closing the container 106. The pest is thus inside the closed container 106 to make disposable of the pest easy—the user places the container 106 in the trash and places a new container into the trap 100.

Substantially simultaneously with the shutter 110 moving from the horizontal to the vertical position, or shortly (e.g., less than thirty seconds) after, the circuit 706 may wirelessly (e.g., using Wi-Fi®, Bluetooth®, or the like) transmit a notification message. The wireless notification message may be sent over a network to a computing device, such as a tablet or a smartphone associated with a user, and may be displayed in an application ("app") being executed by the computing device. For example, a user, such as a homeowner, an employee of a pest control services provider, or a maintenance manager of a commercial building may receive the wireless notification message indicating that a pest was captured and electrocuted. The message may include additional information, such as an identifier or a location of the trap 100, a picture of the pest taken by an imaging sensor (e.g., one of the sensors 108), or the like. One of the indicators 128 may change color (e.g., green=armed, red=pest captured) to provide a visual indication that a pest has been captured and the container 106 is to be replaced.

After a user receives the notification message, the user (or a representative of the user) may open the lid 104 (e.g., using the lid handle 130), remove the container 106 that includes the pest (e.g., using the container handle 126), and dispose of the container 106. In this way, the user does not have to look at or touch the dead pest. Disposal of the pest is relatively sanitary as the dead pest is contained in the container 106 that has been sealed by the door 132. After disposing of the container 106, the user may re-arm the trap 100. For example, the user may place the shutter 110 in the horizontal position (e.g., by pressing the power button for a predetermined amount of time, such as N milliseconds, N>500), confirm using the indicators 128 that the battery level indicator is green, and confirm that the bait level is green. The user may place the container 106 in the housing 102 with the lip 204 engaging with the middle prong 302 of the shutter 110 and close the lid 104, thereby re-arming the trap 100. After power is provided to the electrical contacts 504, the power may travel from the electrical contacts 504 to electrify the conductive plates 510, 512.

The bait packet 144 may be long term food attractant, such as an oil infused with an attractant. The circuit 706 may determine how long the bait packet 144 will last on a rate of diffusion, an ambient temperature (e.g., as measured by a temperature sensor in the sensors 108), a humidity (e.g., as measured by a humidity sensor in the sensors 108), a weight sensor, a microswitch, or the like. The circuit 706 may send a notification to an app executing on a computing device to notify a user (e.g., homeowner, maintenance worker, or pest services employee) that the bait packet 144 is to be replaced. The bait packet 144 may include an attractant, such as a nut-based (peanut oil, hazelnut oil, or the like) or a grain-based oil. In some cases, the circuit 706 may periodically (e.g., at a predetermined time interval) release the bait packet 144 into the atmosphere, e.g., by applying power to a heater. In some cases, the circuit 706 may include an artificial intelligence algorithm to learn (using the sensors 108) when pests are present in a surrounding area and dispense additional amounts of the bait packet 144 at those times.

In some cases, the circuit 706 may include an artificial intelligence algorithm with a preset number of pest profiles to enable the circuit 706 to analyze sensor data received from the sensor 108 to identify a type of pest captured by the trap 100. The circuit 706 may monitor sensor data received from outward facing sensors to analyze and provide suggestions as to where to place additional ones of the trap 100. The trap 100 may have multiple power modes, such as a low power mode during a time period when pest activity is unlikely, such as during the day (e.g., between sunrise and sunset), or when humans are present. For example, the circuit 706 may periodically communicate via a network to determine approximate sunrise and sunset times for a day, a week, or a month and use those times to determine when to transition to a low power mode. As another example, data from an external facing sensor (of the sensors 108) may be used by the circuit 706 to determine when a human is present.

The trap 100 may have a vacation mode that a user can wirelessly engage via a user interface ("UI") of an application ("app"). In vacation mode, the circuit 706 may be placed in a low-power mode or an off mode.

To save the trap's battery power, a web server may periodically (e.g., every M hours, M=12, 24, 36, 48 or the like) receive updates from the trap via a network. One way in which the trap may update the server is using polling. With polling, the trap is in a low power mode, monitoring for pest detection. Once every X hours (X>0) the trap transitions from the low power mode to a higher power mode and sends an update message to the server with various information as described herein (e.g., battery level, attractant level, pest killed, and the like).

In some cases, instead of using a software application ("app"), a user may use a web browser to go to a web interface with a specific internet protocol (IP) address, similar to how a router's settings can be accessed using a web interface. The app (or web interface) may pull the latest status from a server even when the trap is powered off. A user will think they are directly accessing the trap but will in fact be accessing the latest cached data on a server.

Another way in which the trap may update the server (e.g., instead of using polling) is rule-based. In rule-based, the trap wakes up (e.g., transition from low power to a higher power mode) every Y minutes (e.g., Y>5) and checks the status of the various parameters (e.g., battery level, bait level, network connectivity, and the like), and turns on the Wi-Fi to update the server when one or more of the parameters has changed. For example, if the battery level goes from Medium to Low, the trap may wake up (e.g., transition from a low power mode to a higher power mode, turn on Wi-Fi, update the server regarding the battery level, turn off the Wi-Fi, and then go transition back to low power mode. If the trap determines that a pest has been killed, the trap may transition from the low power mode to a higher power mode, turn on Wi-Fi, send a push notification directly to the app, send a notification to the server, turn off the Wi-Fi, and transition from the higher power mode back to the low power mode.

The app on the user's computing device (e.g., smartphone, tablet, or the like) may display information related to the trap 100, such as, for example, a trap status (e.g., armed, pest killed—discard container and replace with new container), trap not ready (e.g., lid open, no container, or both), battery level (e.g., high, medium, low/replace), ambient temperature (e.g., in Fahrenheit or Celsius), bait packet level (e.g., good, partially depleted, replace because bait is almost depleted or completely depleted), Wi-Fi signal strength (e.g., High, Medium, Low, No Signal), container status (e.g., container present, container absent), kill count (0 or more), lid status (e.g., lid open, lid closed), software update (e.g., software application update available, software application update unavailable), amount of time trap has been in an armed mode (e.g., minutes and/or hours), and the like.

The trap 100 may send push notifications, using a network connection, to the software application ("app"). The push notification may include, for example, trap status=kill detected (e.g., one notification per day until the container with the dead pest is replaced with a new container), battery level=low (e.g., once every N days until the batteries are changed, N>0), depleted bait packet (e.g., once every N days until the bait packet is replaced, N>0), container not present (e.g., once every N days until a new container is placed in the receptacle, N>0), and the like.

Figure 14:
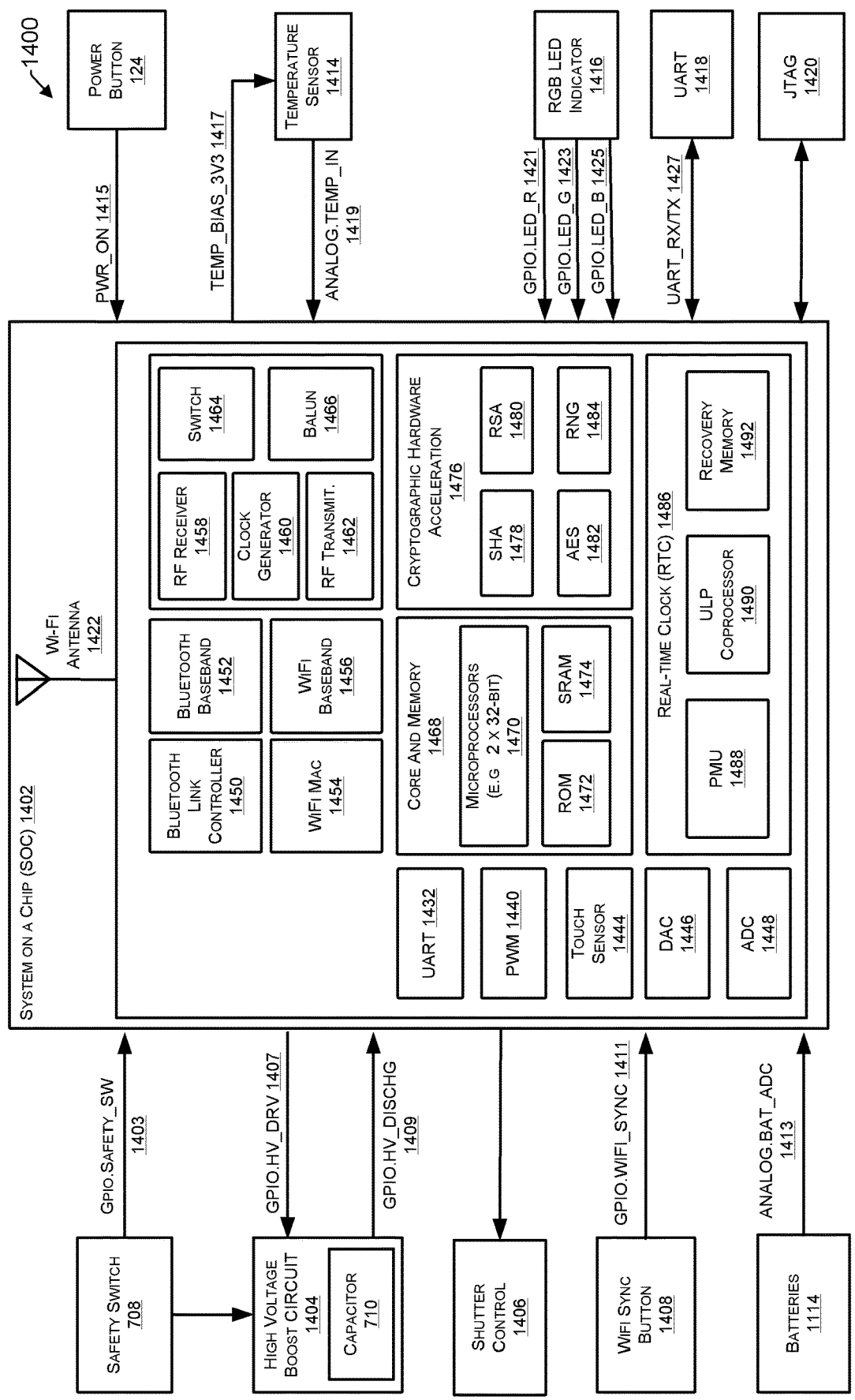
FIG. 14 illustrates a block diagram illustrating components of a circuit in a trap, according to some embodiments.

FIG. 14 illustrates a block diagram 1400 illustrating components of a circuit (e.g., the circuit 706 of FIG. 7) in a trap, according to some embodiments. Various components may use general-purpose input/output (GPIO) signals or other signals (as indicated) to communicate with a system on a chip (SOC) 1402, such as, for example, an Espressif Systems ESP32 or similar.

The safety switch 708 may cause electricity to be supplied to the circuit 706 (e.g., using the GPIO.Safety_SW 1403 connection) when the lid 104 of FIG. 1 is in the closed position and stop electricity from being supplied to the circuit 706 when the lid 104 is in the open position.

A high-voltage boost circuit 1404 may include the capacitor 710. The high-voltage boost circuit 1404 may boost voltage from the batteries to a level sufficient to electrocute a pest, such as a mouse or a rat. For example, when the circuit detects a pest using the metal plates 506, 508 of FIG. 5 in the container 106 (e.g., the circuit may detect a change in the resistance between the plates 506, 508 due to the presence of the pest), the circuit may use the high-voltage boost circuit 1404 to provide a high-voltage across the metal plates 506, 508 a predetermined period of time (e.g., about 3 to 30 seconds, and preferably about 20 seconds). Typically, 3 seconds is sufficient to electrocute a mouse. The high-voltage boost circuit 1404 may provide the high voltage for a longer period of time than 3 seconds, such as up to 20 seconds, to avoid the possibility that the pest is not electrocuted. The voltage provided by the high-voltage boost circuit 1404 may be between 5,000 volts (V) to 15,000 volts (preferably between 7,000 to 10,000 volts) at between 2 to 20 milliamps (MA). GPIO.HV_DRV 1407 may activate the high voltage boost circuit 1404 to produce a voltage spike and the voltage spike may be provided via GPIO.HV_DISCHG 1409.

A shutter control 1406 may control the shutter 110 of FIG. 1 to open and close the door 132 of the container 106 via a signal from the SOC 1402. The shutter control 1406 may be an electrical motor or other mechanism capable of opening and closing the door 132 when the shutter 110 is engaged with the door 132 (e.g., as illustrated in FIG. 4B).

A Wi-Fi sync button 1408 may, when selected, may instruct (via GPIO.WIFI_SYNC 1411) the SOC 1402 to connect, via a peer-to-peer protocol, to a user's computing device. For example, the SOC 1402 may act as an access point. The user may access an application ("app") capable of wirelessly communicating with the SOC 1402 to enter a Wi-Fi password of a Wi-Fi network to enable the SOC 1402 to connect to the Wi-Fi network.

The batteries 1114 may provide (via GPIO.BAT_ADC 1415) direct-current (DC) voltage to power the circuit described herein. The batteries 1114 may be capable of powering the circuit between about 18 to 24 months (on average about 20 months using AA alkaline batteries), depending on how many pests are electrocuted. The battery life may decrease if a greater number of pests are electrocuted and may increase if a relatively small number of pests are electrocuted.

The power button 124, when selected, may send a power-on signal (via PWR_ON 1411) to the SOC 1402. A temperature sensor 1414 may provide an analog temperature (via ANALOG.TEMP_IN 1419) which a digital to analog converter (DAC) 1446 of the SOC 1402 may convert into a digital signal. Temp_Bias_3V3 1417 may apply a voltage to a thermistor in the voltage sensor 1414 and Analog.Temp_In 1419 may provide an analog measurement of an ambient temperature. For example, the circuit 1400 may periodically (e.g., at a predetermined time interval) transition from a monitor mode (e.g., a low power consumption mode) to an awake mode (e.g., higher power consumption mode), initiate the Temp_Bias_3V3 1417 to apply a voltage to the voltage sensor 1414, sample the Analog.Temp_In 1419 to determine the temperature, and then stop applying the Temp_Bias_3V3 1417. This may be done to conserve power because using the Temp_Bias_3V3 1417 to apply a voltage to the temperature sensor 1414 uses up electricity. By briefly applying a voltage at a predetermined time interval, much less voltage is used, enabling lower power consumption and longer battery life.

A RGB light emitting diode (LED) indicator 1416 represents one indicator of the multiple indicators 128 of FIG. 1 that are used to indicate a battery level, a bait level, a Wi-Fi connection strength, whether a pest has been captured, whether the trap 100 is armed, whether the container 106 is present, whether the lid 104 is closed, and the like. The representative RGB LED indicator 1416 may, for example, use any combination of 3 colors, e.g., red (via GPIO.LED_R 1421), green (via GPIO.LED_G 1423), or blue (via GPIO.LED_B 1425).

A universal asynchronous receiver-transmitter (UART) 1418 is a computer hardware device for asynchronous serial communication in which the data format and transmission speeds are configurable. The UART 1418 may be used by a manufacturer of the trap 100 to develop and debug firmware for the circuit 1400. The UART 1418 may communicate with the SOC 1402 via UART.RX/TX 1427.

Joint Test Action Group (JTAG) 1420 may be used to verify and test circuit boards, such as the circuit 1400, after manufacture. JTAG implements standards for on-chip instrumentation in electronic design automation (EDA) as a complementary tool to digital simulation.

The system-on-a-chip 1402 may include various components. For example, the system-on-a-chip 1402 may include a UART 1432, a pulse width modulation (PWM) component 1440, and a touch sensor 1444. The system-on-a-chip 1402 may include various components to convert a digital signal to an analog signal and vice versa, such as, for example, a digital to analog converter (DAC) 1446 and an analog-to-digital converter (ADC) 1448. The system-on-a-chip 1402 may include components to connect wirelessly, using Bluetooth. Wi-Fi, or both, such as, for example, a Bluetooth link controller 1450, a Bluetooth baseband 1452, a Wi-Fi antenna 1422, a Wi-Fi media access control (MAC) 1454, and Wi-Fi baseband 1456. The system-on-a-chip 1402 may include a radio frequency (RF) receiver 1458, a clock generator 1460, an RF transmitter 1462, a switch 1464, and a balun 1466 (e.g., to connect a balanced line to an unbalanced line).

The system-on-a-chip 1402 may include a core and memory 1468. The court memory 1468 may include at least two microprocessors 1470, a read only memory (ROM) 1472 to store firmware, and static random-access memory (SRAM) 1474. For example, the SRAM 1474 may be used as a cash for the microprocessors 1470. They system-on-a-chip 1402 may include cryptographic hardware acceleration 1476 to provide security to prevent a hacker from accessing a user's home network through the trap 100. For example, the cryptographic hardware acceleration 1476 may include a component to perform one or more secure hashing algorithms (SHA) 1478, a Rivest-Shamir-Adleman (RSA) cryptosystem component 1480, advanced encryption system (AES) 1482, and a random number generator (RNG) 1484.

The system-on-a-chip 1402 may include a real-time clock RTC 1486. For example, the RTC 1486 may include a power management unit (PMU) 1488, and ultra-low power (ULP) coprocessor 1490, and recovery memory 1492. The ULP coprocessor 1490 may be a coprocessor that can perform various functions (e.g., monitor mode) when the system-on-a-chip 1402 is in a low-power consumption mode. For example, after the trap 100 is armed, the ULP coprocessor 1490 may monitor for a change in certain conditions such as whether a past has entered the container, causing a low resistance between the two metal plates in the container. The PMU 1488 may manage power by performing various functions including determining when to enter a low-power mode and use the ULP 1490 and went to transition from the low power mode to a normal mode and use the microprocessors 1470. The recovery memory 1492 may include data to enable the system-on-a-chip 1402 to recover when power is interrupted such as, for example, when the batteries 1114 are changed to a fresh set of batteries.

FIG. 15 illustrates a system diagram 1500 that includes multiple traps sending data to a server, according to some embodiments. In the system 1500, multiple traps 1502(1) to 1502(N) (N>0) may be wirelessly connected to one or more servers 1504 via one or more networks 1506. For example, each of the traps 1502 may be an implementation of the trap 100 of FIG. 1. Each trap 1502 may include the multiple indicators 128. For example, the indicators 128 may include a battery status indicator 1508, a network status indicator 1510, a bait status indicator 1512, a trap status indicator 1514, a temperature indicator 1516, a container status indicator 1518, a lid status indicator 1520, and a firmware update indicator 1522. The battery status indicator 1508 may indicate a status of the batteries 1114. For example, the battery status indicator 1508 may display green when the battery level is greater than or equal to a first threshold, yellow when the battery level is less than the first threshold but greater than a second threshold, and red when the battery level is at or below the second threshold. The network status indicator 1510 may indicate a status of a network connection, such as a Wi-Fi or other wireless connection between the trap 1502 and the network 1506. For example, green may indicate that the trap 1502 is connected to the network 1506, yellow may indicate that the connection has a poor signal strength or is intermittent, and red may indicate that the trap 1502 is not connected to the network 1506. The bait status indicator 1512 may display a status of the bait packet 144 pf FIG. 1. For example, the bait status indicator 1512 may display green when the bait level is estimated to be greater than or equal to a first threshold, yellow when the bait level is estimated to be less than the first threshold but greater than a second threshold, and red when the bait level is estimated to be at or below the second threshold. The trap status indicator 1514 may indicate a status of the trap 1502. For example, the trap status indicator 1514 may display green when the trap 1502 is armed, red when the trap 1502 has captured a pest (e.g., in the container 106), and the yellow when the trap 1502 is not ready (e.g., when the lid 104 is open or the container 106 is absent). The temperature indicator 1516 may display green when the temperature is within a normal range and red when the temperature is outside the normal range. The container indicator 1518 may indicate the presence of the container 106. For example, the container indicator 1518 may display green when the container 106 is present and red when the container 106 is absent (or improperly oriented). The lid status indicator 1520 may indicate a status of the lid 104. For example, the lid status indicator 1520 may display green when the lid 104 is closed and red when the lid 104 is open. The firmware update indicator 1522 may indicate whether a firmware update 1530 is available for download from the server 1504 to the trap 1502.

Each trap may periodically (e.g., at a predetermined time interval) send data to the server 1504. For example, when the trap 1502(1) is armed, the trap 1502(1) may send data 1524 at a predetermined time interval (e.g., every P hours, where P>0) to the server 1504. In this way, after the trap 1502(1) is armed, the trap 1502(1) may enter into a monitor mode in which the trap 1502 (1) waits for a pest to enter. The monitor mode may be a relatively low power consumption mode. The trap 1502(1) may set a timer and, at the predetermined time interval, transition to an awake mode, send the data 1524 to the server 1504, and transition back to the monitor mode (e.g., low power consumption). In this way, the trap 1502(1) may conserve battery power. In the awake mode, the trap 1502(1) may check a level of the batteries and determine an amount of remaining bait.

The server 1504 may receive the data 1524 from each of the traps 1502, associate the data 1524 with the trap 1502 that sent the data, and store the data 1524 as stored data 1526 in a database 1528. For example, the trap 1502(1) may have associated stored data 1526(1) and the trap 1502(N) may have associated stored data 1526(N).

A user may use a computing device 1532 (e.g., a smart watch, a smart phone, a tablet, a laptop, a desktop, or another type of computing device) to monitor the indicators 128 associated with one or more traps 1502 (e.g., a subset of the traps 1502(1) to 1502(N)). For example, the computing device 1532 may execute an application ("app") 1534. The server 1504 may send a subset 1536 of the stored data 1526 to the computing device 1532. The app 1534 may display the subset 1536. For example, the user may deploy traps 1502 (1) to 1502(M) (N>M>0) in the user's house and monitor those traps using the app 1534. For example, a city may have thousands of homeowners with each homeowner having a handful of traps 1502 (e.g., N=50,000) sending data 1524 to the server 1504 while the user may have a handful of traps (e.g., M=6) deployed in his house. Thus, the app 1534 may display the traps 1502(1) to 1502(M) and associated data 1538(1) to 1538(M). The associated data 1538 may include a status of the indicators 128 associated with the traps 1502(1) to 1502(M). In this way, instead of having to manually examine each of the traps 1502(1) to 1502(M), the user can view the status of the indicators 128 associated with each of the traps 1502(1) to 1502(M) using the app 1534 executing on the user's computing device.

The trap 1502 may send a notification 1540 to the server 1504 under certain circumstances. For example, if the trap 1502 detects that a pest has entered the trap 1502, then the trap 1502 may send the notification 1540 indicating that a pest has been captured. If the battery level 1508 falls below the second threshold, e.g., indicating that there is a short amount of battery life left, then the trap 1502 may send the notification 1540 to the server 1504 indicating that the batteries are to be replaced. If the bait level falls below the second threshold, e.g., indicating that the bait packet 144 is nearly depleted, then the trap 1502 may send the notification 1540 to the server 1504 indicating that the bait packet 144 is to be replaced.

Each trap 1502 may determine an ambient temperature and estimate how much of the bait packet 144 remains because the dissipation (e.g., evaporation) of the bait in the bait packet 144 is a function of the ambient temperature. For example, the bait packet 144 may dissipate more slowly (e.g., resulting in a longer life) when the ambient temperature is relatively low (e.g., N degrees Fahrenheit or less, such as, e.g., N=70) and the bait packet 144 may dissipate more quickly (e.g., resulting in a shorter life) when the ambient temperature is relatively high (e.g., N+1 degrees Fahrenheit or higher, e.g., N=70).

Figure 16:
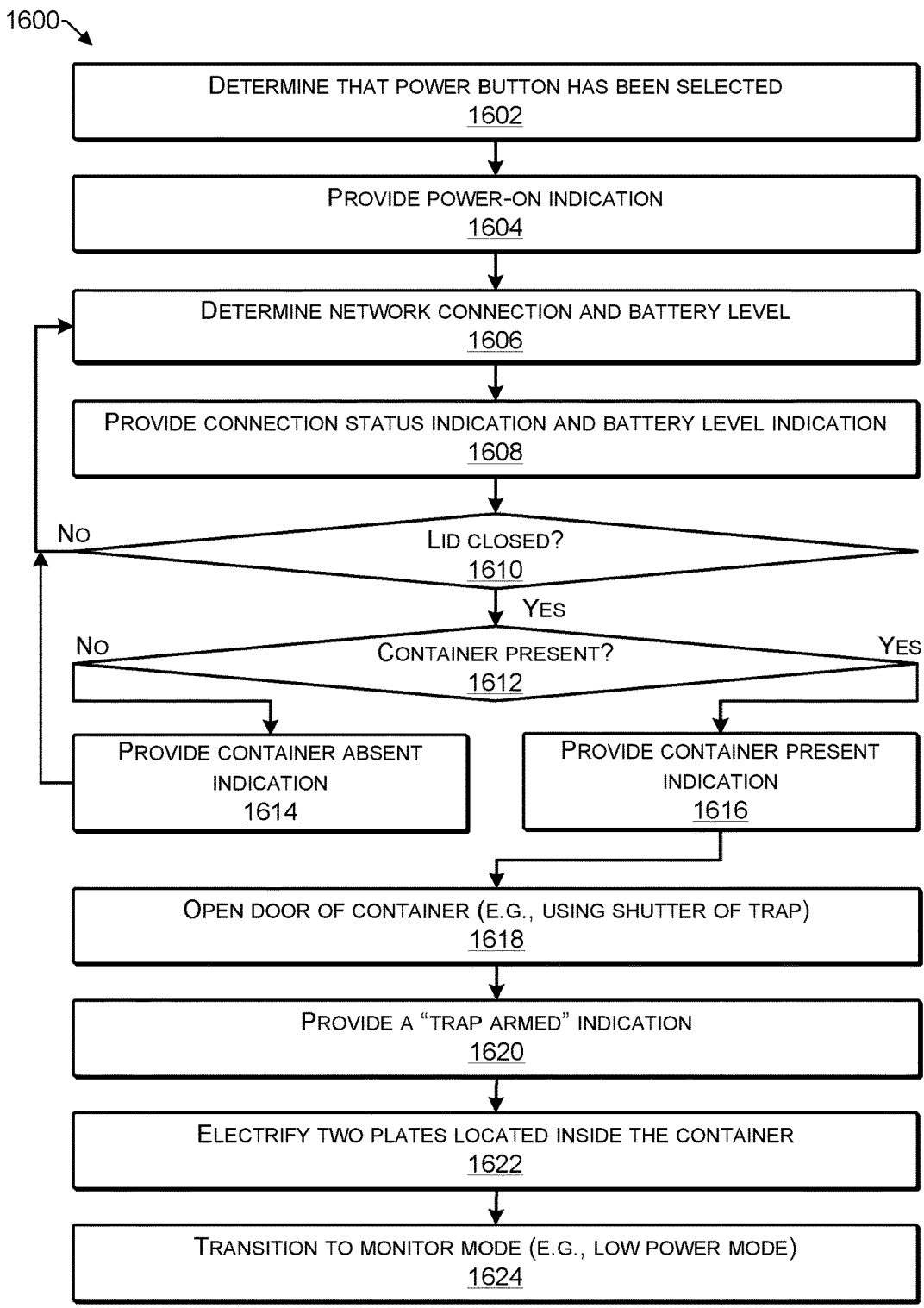
FIG. 16 is a flow diagram of a process that includes determining that a power button has been selected, according to some embodiments.

FIG. 16 is a flow diagram of a process 1600 that includes determining that a power button has been selected, according to some embodiments. The process 1600 may be performed by the circuit 706 of the trap 100 of FIG. 7 or each of the traps 1502 of FIG. 15.

At 1602, the process may determine that a power button has been selected. At 1604, the process may provide a power on indication. At 1606, the process may determine a network connection and a battery level. At 1608, the process may provide a connection status indication and a battery level indication. For example, in FIG. 1, the circuit 706 of FIG. 7 may detect that the power button 128 of FIG. 1 has been selected. In response, the circuit 706 may use one of the indicators 128 (e.g., the trap indicator 1514 of FIG. 1) to indicate that the trap 100 has been powered on. In some cases, the trap 1502 of FIG. 15 may send the notification 1540 to the server 1504 indicating that the trap 1502 has been powered on. The process may determine a network connection of the trap 1502 to the network 1506 and provide an indication of the network connection using the network indicator 1510. The process may determine a battery level of the batteries 1114 of FIG. 11 and display a status of the batteries 1114 using the battery indicator 1508. In some cases, the trap 1502 of FIG. 15 may send the notification 1540 to the server 1504 indicating that the battery level of the batteries 1114.

At 1610, the process may determine whether a lid of the trap is closed. If the process determines, at 1610, that "no" the lid is not closed (e.g., the lid is open), then the process may proceed to 1606 and determine the network connection and the battery level. If the process determines, at 1610, that "yes" the lid is closed, then the process may proceed to 1612. At 1612, the process may determine whether a container is present. If the process determines, at 1612, that "no" a container is not present, then the process may proceed to 1614, where the process may provide an indication that the container is absent, and the process may proceed to 1606. If the process determines, at 1612, that "yes" a container is present, then the process may proceed to 1616, where the process may provide an indication that the container is present, and proceed to 1618.

At 1618, a door of the container may be opened, for example (e.g., by using a shutter of the trap). For example, to open the door 132 of the container 106, the shutter 110 may transition from an approximately vertical position, as illustrated in FIG. 8C, to an approximately horizontal position as illustrated in FIG. 8A.

At 1620, the process may provide a "trap armed" indication. For example, in FIG. 1, one of the indicators 128 may indicate that the trap 100 is in an armed state.

At 1622, the process may electrify two plates located inside the container. For example, in FIG. 5, a pair of the contacts 504 (e.g., 504(1) and 504(4)) may be provided power. The contacts 504 may be in touch with the plates 510, 512 of the container 106, causing the plates 506, 508, respectively, inside the container 106 to be electrified.

At 1624, the process may transition to a monitor mode (e.g., a low power consumption mode). For example, the trap 100 may appear as illustrated in FIG. 12D and may transition into a low power mode in which a resistance across the plates 506, 508 may be monitored.

Figure 17:
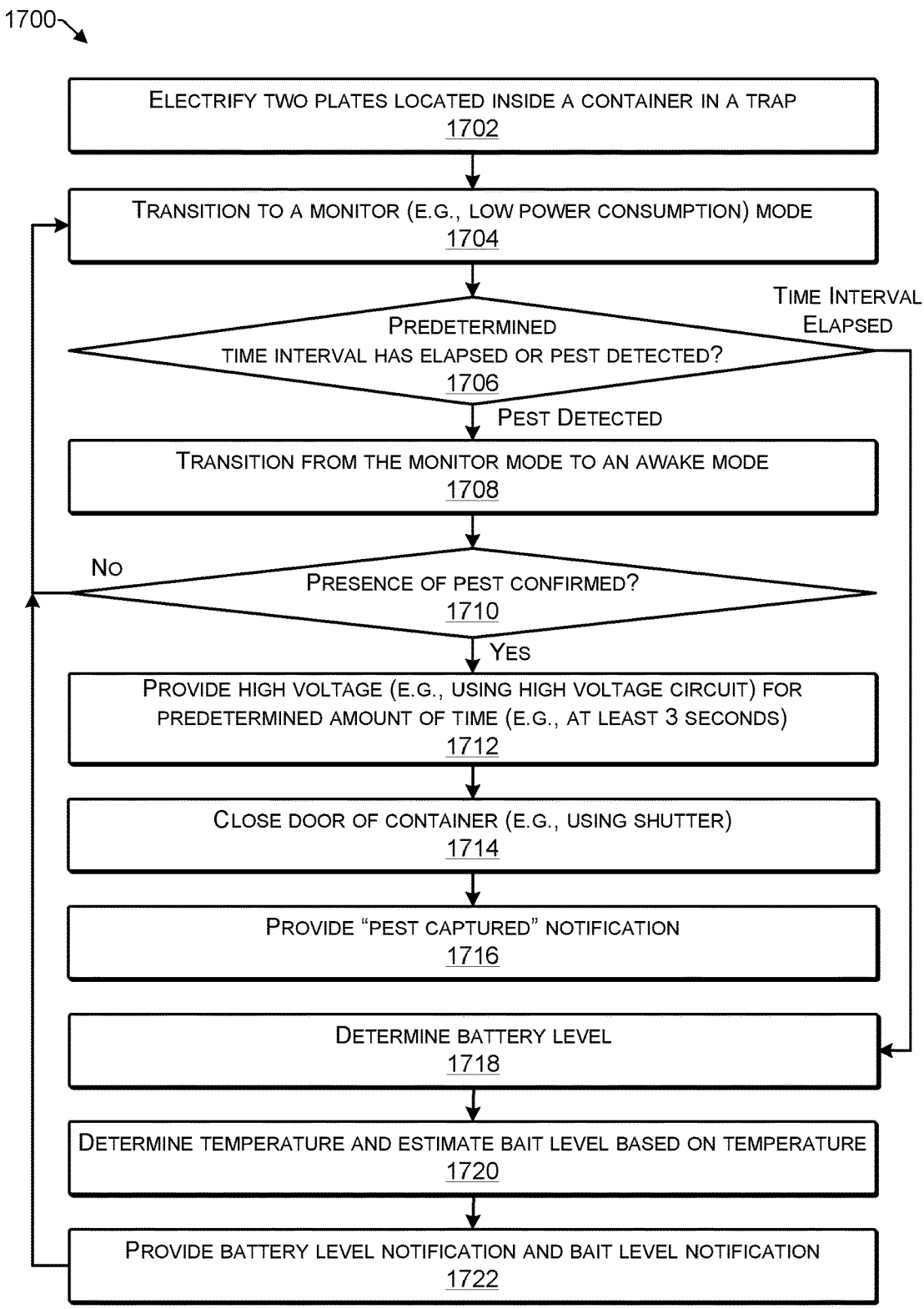
FIG. 17 is a flow diagram of a process that includes electrifying two plates in a container in a trap, according to some embodiments.

FIG. 17 is a flow diagram of a process 1700 that includes electrifying two plates in a container in a trap, according to some embodiments. The process 1700 may be performed by the circuit 706 of the trap 100 of FIG. 7 or each of the traps 1502 of FIG. 15.

At 1702, the process may electrify two plates located inside a container in a trap. At 1704, the process may transition to a monitor mode (e.g., a low power consumption mode). For example, in FIG. 5, a pair of the contacts 504 (e.g., 504(1) and 504(4)) may be provided power. The contacts 504 may be in touch with the plates 510, 512 of the container 106, causing the plates 506, 508, respectively, inside the container 106 to be electrified. The trap 100 may appear as illustrated in FIG. 12D and may transition into a low power mode in which a resistance across the plates 506, 508 may be monitored.

At 1706, the process may determine whether a predetermined time interval has elapsed or whether a pest has been detected (e.g., in the container). If the process determines, at 1706, that a pest has been detected, then the process may proceed to 1708. If the process determines, at 1706 that the time interval has elapsed, then the process may proceed to 1718. For example, the process may set a timer (e.g., N minutes, such as N=60, 90, 120, or the like) and be woken by the timer when the amount of time that was set has elapsed. As another example, the process may monitor resistance across the plates 510, 512. When a pest enters the container and makes contact with the plates 510, 512, the pest may provide a lower resistance across the plates 510, 512, and the process may detect the change in resistance to the lower resistance.

At 1708, the process may transition from the monitor mode (e.g., low power consumption) to an awake mode (e.g., higher power consumption). At 1710, the process may confirm whether a pest is present (e.g., in the container). If the process determines, at 1710, that "no" the pest is not present, then the process may proceed back to 1704 and transition back to the monitor mode. If the process determines, at 1710, that "yes" the pest is present, then the process may proceed to 1712 where the process may cause the high-voltage circuit to provide a high-voltage for a predetermined amount of time (e.g., at least 3 seconds) across the two plates located inside the container. If the process detects a pest in the container (e.g., based on the change in resistance), then the process may transition from the monitor mode to an awake mode. For example, in FIG. 14, the ultra low power coprocessor 1490 may be used in the monitor mode and the microprocessors 1470 used in the awake mode. The process may confirm that a pest has entered the container 106 by double checking the resistance across the plates 510, 512. If the process determines that the resistance across the plates 510, 512 does not indicate the presence of the past in the container 106, then the process may transition the trap 100 from the awake mode to the monitor mode (e.g., to conserve battery power). If the process determines that the resistance across the plates 510, 512 indicates the presence of the past in the container 106, then the process may cause the high-voltage boost circuit 1404 to provide a high-voltage surge (e.g., between about 5,000 to 15,000 volts at 20 milliamps or less) for a predetermined amount of time (e.g., at least 3 seconds and preferably about 20 seconds).

At 1714, the process may close the door of the container (e.g., using the shutter). At 1716, the process may provide a pest captured notification. For example, in FIG. 14, the shutter control 1406 may be used to move the shutter 110 from an approximately horizontal position to an approximately vertical position to close the door 132 of the container 106 (e.g., causing the latch protrusions 138 to engage with the latch jaws 202, as illustrated in FIG. 2A, 2B).

At 1718, the process may determine a battery level. At 1720, the process may determine a temperature and estimate a remaining amount of bait based on the temperature. At 1722, the process may provide a battery level notification and a bait level notification. The process may proceed back to 1704 and transition to the monitor mode. For example, in FIG. 14, the system-on-a-chip 1402 may determine the level of the batteries 1114, determine a temperature using the temperature sensor 1414, and use the RGB LED indicator 1416 to indicate a battery level (e.g., a remaining amount of the batteries 1114) and an ambient temperature. In some cases, as described in FIG. 15, the trap 1502 may send the notification 1540 via the network 1506 to the server 1504, the computing device 1532, or both.

FIG. 18 is a block diagram illustrating a portion of a circuit to detect a presence of a pest, according to some embodiments. A pulse width modulation 1802 component may be used along with direct current (DC) 1804 provided by the batteries 1114 on one side of a transformer 1806 to create alternating current (AC) 1808 on the other side of the transformer 1806. The AC 1808 may be provided across a pair of the electrical contacts 504 (e.g., contacts 504(2) and 504(3)) to provide voltage across the plates 506, 508. A high voltage diode 1810 may be placed across the plates 506, 508. For example, the high voltage diode 1810 may be a 2CL72 (10 kilovolts (KV), 5 milliamperes (mA), 100 nano-seconds (nS)) or similar. The high voltage diode 1810 may provide a small, but detectable, amount of voltage across the plates 506, 508.

When a pest 1812 enters the container 106 of FIG. 1, the presence of a pest 1812 may be detected across the plates 506, 508 because the pest 1812 provides lower resistance than the high voltage diode 1810. The analog-to-digital converter 1448 of the SOC 1402 of FIG. 14 may be used to digitally monitor the voltage across the plates 506, 508 and detect when the pest 1812 has entered the container 106.

Figure 19A:
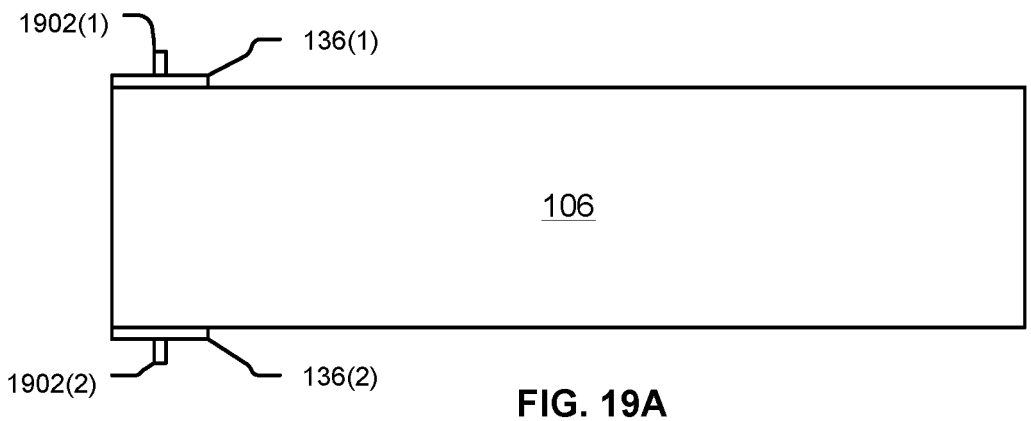
FIG. 19A is a block diagram illustrating a top view of a keyed container, according to some embodiments.

FIG. 19A is a block diagram illustrating a top view of a keyed container, according to some embodiments. To prevent the container 106 from being placed in the receptacle 140 in an incorrect orientation, the container 106 may be keyed. For example, the container 106 may include the side braces 136. In some cases, the side braces 136 may be T-shaped, as illustrated in FIG. 19A and FIG. 19B, with each of the side braces 136(1), 136(2) having an approximately perpendicular protrusion 1902(1), 1902(2), respectively.

Figure 19B:
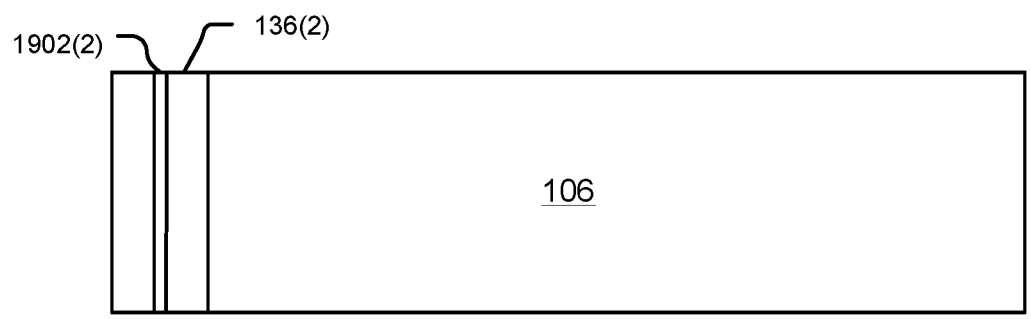
FIG. 19B is a block diagram illustrating a side view of a keyed container, according to some embodiments.

FIG. 19B is a block diagram illustrating a side view of a keyed container, according to some embodiments. The side braces, such as the side brace 136(2) including the perpendicular protrusion 1902(2), may run along the side of the container 106.

Figure 19C:
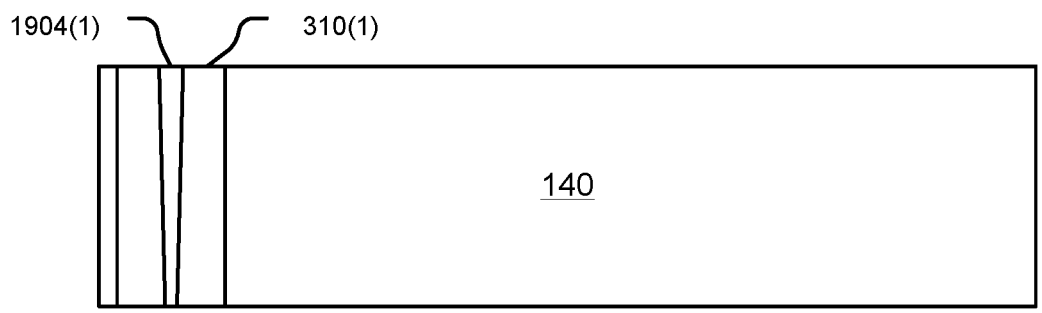
FIG. 19C is a block diagram illustrating a side view of a receptacle in which a keyed container may be placed, according to some embodiments.

FIG. 19C is a block diagram illustrating a side view of a receptacle in which a keyed container may be placed, according to some embodiments. Each of the orientation grooves, such as the orientation groove 310(1), may include an additional groove 1904(1) into which the perpendicular protrusion 102(1) may be placed. In some cases, to make it easier for a user to place the container 106 into the receptacle 140, the additional groove 1904(1) may be tapered, as illustrated in FIG. 19C. The wider opening at the top of the additional groove 1904(1) may make it easier for a user to line up and slide the side braces 136 into the orientation grooves 310.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   providing, by one or more processors of a trap, electricity to two conductive plates located on in an inner bottom surface of a container;
   determining, by one or more processors, that a pest has entered the trap and caused the electricity to pass through the pest; and;
   causing, by the one or more processors, a shutter inside the trap to move from an approximately horizontal position to an approximately vertical position, wherein the shutter is engaged with a door of container and causes the door of the container to close;
   sending, by the one or more processors, a notification message over a wireless network to a computing device, the notification message indicating that the pest has been captured in the container.

2. The method of claim 1, wherein the container is removed from the trap and replaced with a new container after the electricity passes through the pest.

3. The method of claim 1, wherein the trap includes a bait comprising a permeable membrane infused with an oil-based attractant or a grain-based attractant.

4. The method of claim 1, wherein:
   the container comprises at least one of treated paper or plastic.

5. The method of claim 1, further comprising:
   indicating, using a first indicator light of the trap, a status of a connection between the trap and the wireless network;
   indicating, using a second indicator light of the trap, a battery level of one or more batteries used to power the trap; and
   indicating, using a third indicator light of the trap, a status of a bait packet used to attract the pest to enter into the trap.

6. The method of claim 1, wherein causing the shutter inside the trap to move from the approximately horizontal position to the approximately vertical position comprises:
   providing the electricity to a motor located in a shutter hinge attached to the shutter, causing the motor to move the shutter at the shutter hinge.

7. The method of claim 1, wherein the shutter moving from the approximately horizontal position to the approximately vertical position causes:
   a first latch strike of the door to engage with a first pair of latch jaws of the container; and
   a second latch strike of the door to engage with a second pair of latch jaws of the container.

8. A trap comprising:
   a first electrical contact and a second electrical contact located on an inner bottom surface of the trap;
   a container placed inside the trap, the container including a first conductive plate and a second conductive plate located on an inner bottom surface of the container, the first conductive plate having a first portion that is exposed to an exterior of the container, and the second conductive plate having a second portion that is exposed to the exterior of the container;
   one or more processors; and
   one or more non-transitory computer readable media storing instructions executable by the one or more processors to perform operations comprising:
      providing electricity to:
         the first electrical contact and the second electrical contact to electrify the first conductive plate and the second conductive plate;
      wherein after a pest enters into the container:
         the electricity passes from the first conductive plate through the pest to the second conductive plate;
         determining that a circuit that includes the first conductive plate and the second conductive plate has been closed by the pest;
         based on determining that the circuit has been closed by the pest, moving a shutter inside the trap from an approximately horizontal position to an approximately vertical position, the shutter causing a door of the container to close the container with the pest in the container; and
         sending a notification message over a wireless network to a computing device, the notification message indicating that the pest has been captured in the container.

9. The trap of claim 8, further comprising:
   a bait comprising a permeable membrane infused with a nut-based attractant or a grain-based attractant.

10. The trap of claim 8, wherein:
    the container comprises at least one of treated paper or plastic.

11. The trap of claim 8, the operations further comprising:
indicating, using a first indicator light of the trap, a status of a connection between the trap and the wireless network;
indicating, using a second indicator light of the trap, a battery level of one or more batteries used to power the trap; and
indicating, using a third indicator light of the trap, a status of a bait packet used to attract the pest to enter into the trap.

12. The trap of claim 8, wherein causing the shutter inside the trap to move from the approximately horizontal position to the approximately vertical position comprises:
providing the electricity to a motor located in a shutter hinge attached to the shutter, causing the motor to move the shutter at the shutter hinge.

13. The trap of claim 8, wherein the shutter moving from the approximately horizontal position to the approximately vertical position causes:
a first latch strike of the door to engage with a first pair of latch jaws of the container; and
a second latch strike of the door to engage with a second pair of latch jaws of the container.

14. A trap comprising:
a first electrical contact and a second electrical contact located on an inner bottom surface of the trap;
a container placed inside the trap, the container including a first conductive plate and a second conductive plate located on an inner bottom surface of the container, a first portion of the first conductive plate exposed to an exterior bottom surface of the container and touching the first electrical contact, a second portion of the second conductive plate exposed to the exterior bottom surface of the container and touching the second electrical contact;
one or more processors; and
one or more non-transitory computer readable media storing instructions executable by the one or more processors to perform operations comprising:
providing electricity in an open circuit that includes the first electrical contact and the second electrical contact;
wherein after a pest enters into the container and makes contact with both the first conductive plate and the second conductive plate, the electricity passes from the first conductive plate through the pest to the second conductive plate to electrocute the pest;
based on determining that the open circuit has been closed by the pest, causing a shutter inside the trap to move from an approximately horizontal position to an approximately vertical position, thereby causing a door of the container to close; and
sending a notification message over a wireless network to a computing device, the notification message indicating that the pest has been captured in the container.

15. The trap of claim 14, wherein the container is removed from the trap and replaced with a new container after the electricity passes through the pest.

16. The trap of claim 14, wherein the trap includes a bait comprising a permeable membrane infused with a nut-based attractant or a grain-based attractant.

17. The trap of claim 14, wherein:
the container comprises at least one of treated paper or plastic.

18. The trap of claim 14, the operations further comprising:
indicating, using a first indicator light of the trap, a status of a connection between the trap and the wireless network;
indicating, using a second indicator light of the trap, a battery level of one or more batteries used to power the trap; and
indicating, using a third indicator light of the trap, a status of a bait packet used to attract the pest to enter into the trap.

19. The trap of claim 14, wherein causing the shutter inside the trap to move from the approximately horizontal position to the approximately vertical position comprises:
providing the electricity to a motor located in a shutter hinge attached to the shutter, causing the motor to move the shutter at the shutter hinge.

20. The trap of claim 14, wherein the shutter moving from the approximately horizontal position to the approximately vertical position causes:
a first latch strike of the door to engage with a first pair of latch jaws of the container; and
a second latch strike of the door to engage with a second pair of latch jaws of the container.

* * * * *